United States Patent
Li et al.

(10) Patent No.: US 9,910,671 B2
(45) Date of Patent: Mar. 6, 2018

(54) VECTOR OPERATION CORE AND VECTOR PROCESSOR

(71) Applicant: ZTE MICROELECTRONICS TECHNOLOGY CO., LTD, Shenzhen (CN)

(72) Inventors: Aijun Li, Shenzhen (CN); Wenqiong Lin, Shenzhen (CN)

(73) Assignee: SANECHIPS TECHNOLOGY CO. LTD., Nanshan District Shenzhen (CN)

(*) Notice: Subject to any disclaimer, the term of this patent is extended or adjusted under 35 U.S.C. 154(b) by 60 days.

(21) Appl. No.: 15/023,617

(22) PCT Filed: May 20, 2014

(86) PCT No.: PCT/CN2014/077914
§ 371 (c)(1),
(2) Date: Mar. 21, 2016

(87) PCT Pub. No.: WO2015/039452
PCT Pub. Date: Mar. 26, 2015

(65) Prior Publication Data
US 2016/0210146 A1 Jul. 21, 2016

(30) Foreign Application Priority Data
Sep. 22, 2013 (CN) .......................... 2013 1 0433489

(51) Int. Cl.
*G06F 17/14* (2006.01)
*G06F 9/30* (2018.01)

(52) U.S. Cl.
CPC ........ *G06F 9/30036* (2013.01); *G06F 9/3001* (2013.01); *G06F 9/30061* (2013.01); *G06F 17/142* (2013.01)

(58) Field of Classification Search
None
See application file for complete search history.

(56) References Cited

U.S. PATENT DOCUMENTS

| 4,689,762 A | * | 8/1987 | Thibodeau, Jr. ...... G06F 17/142 708/408 |
| 5,941,940 A | * | 8/1999 | Prasad .................. G06F 17/142 708/404 |

(Continued)

FOREIGN PATENT DOCUMENTS

| CN | 101836202 A | 9/2010 |
| CN | 201993753 U | 9/2011 |

(Continued)

OTHER PUBLICATIONS

International Search Report for corresponding application PCT/CN20141077914 filed May 20, 2014; dated Aug. 5, 2014.

(Continued)

*Primary Examiner* — David H Malzahn
(74) *Attorney, Agent, or Firm* — Cantor Colburn LLP

(57) ABSTRACT

A vector operation core and a vector processor are provided. The vector operation core use two three-input adders and four data negators, so that the data input into the input adders may be flexibly negated. In addition to being provided with the vector operation core, the vector processor also comprises a control unit, which controls a selector and the negators in the vector operation core. The vector processor may simultaneously support butterfly operations in a base 2, base 3 and base 5 fast Fourier transform. The vector operation core may be widely applied to the design of the programmable vector processor in a multimode-compatible mobile terminal chip.

17 Claims, 14 Drawing Sheets

(56) References Cited

U.S. PATENT DOCUMENTS

| | | | | |
|---|---|---|---|---|
| 7,164,723 B2* | 1/2007 | Sunwoo | ............. | H04L 27/2628 375/260 |
| 8,194,532 B1* | 6/2012 | Whyte | ................. | G06F 17/142 370/210 |
| 8,266,196 B2* | 9/2012 | Cousineau | ............ | G06F 17/142 708/404 |
| 8,577,946 B2* | 11/2013 | Horikawa | ............ | G06F 17/142 370/210 |
| 8,788,558 B2* | 7/2014 | Persson | ................ | G06F 17/142 708/200 |
| 2003/0009502 A1* | 1/2003 | Katayanagi | ........... | G06F 9/3001 708/622 |
| 2005/0131976 A1* | 6/2005 | Sunwoo | ................ | G06F 17/142 708/404 |
| 2016/0210146 A1* | 7/2016 | Li | ........................ | G06F 17/142 |

FOREIGN PATENT DOCUMENTS

| | | |
|---|---|---|
| CN | 102760117 A | 10/2012 |
| CN | 103631759 A | 3/2014 |
| EP | 0889416 A2 | 1/1999 |
| EP | 1271338 A2 | 1/2003 |
| EP | 1429256 A2 | 6/2004 |
| WO | 2012145986 A1 | 11/2012 |

OTHER PUBLICATIONS

Chinese Action Application No. 2013104334897; dated Sep. 22, 2013; pp. 1.

Johan Lofgren, et al.: "On Hardware Inplementaion of Radix 3 and Radix 5 FFT Kernels for LTE Systems" Norchip, 2011, IEEE, Nov. 14, 2011, pp. 1-4, XP032092356; ISBN: 978-1-4577-0514-4.

Lange, et al.: "Reconfigurable Multiply-Accumulate-Based Processing Element", Proceedings of the 2002 IEEE Workshop on Heterogenous Systems on a Chip, Hamburg, Germany, 2002, pp. 1-4, XP002541030.

Prasad, et al.: "Half-Rate GSM Vocoder Impelementation on a Dual Mac Digital Signal Processor", 1997 IEEE International Conference on Acoustics, Speech, and Signal Processing, Apr. 21, 1997, pp. 619-622 XP000789223; ISBN: 978-0-8186-7920-9.

Supplementary European Search Report Application No. EP14846444; dated Feb. 24, 2017; pp. 9.

* cited by examiner

VECTOR OPERATION CORE AND VECTOR PROCESSOR

TECHNICAL FIELD

The present disclosure relates to the flied of vector processor in chip design, and in particular to a vector ALU (Arithmetic Logical Unit) for butterfly operations in Fast-Fourier Transform.

BACKGROUND

At present, there are many modes of communication protocols such as Global System for Mobile communication (GSM), Universal Mobile Telecommunications System (UMTS), Wireless Local Area Network (WLAN), Time Division-Synchronization Code Division Multiple Access (TD-SCDMA) and Long Term Evolution (LTE) and so on, which utilize an original design method of Application-Specific Integrated Circuit (ASIC) to realize the multimode-compatible mobile terminal chips, and this surely faces defects such as larger area and lack of flexibility, etc. The current Software-Defined Radio (for short SDR) technology is a promising technology for solving the current design problems of multimode-compatible mobile terminal chips. A programmable vector processor is a core architecture of the SDR technology. In order to support the processing of multimode baseband, a vector processor must be able to perform several gigabytes per second of operations, and as a mobile terminal needs to meet several hundreds of mW of power dissipation.

An operation unit therein is a core operation part of the vector processor, the performance of which determines the performance of the whole processor, and moreover the power dissipation of which accounts for nearly half of power dissipation of the processor, and therefore the design and implementation of this part is very critical.

There are many structures for the vector ALU, which may implement the general multiplication, addition, multiplication addition, and may also implement the complex multiplication, addition, multiplication addition and butterfly operations in a specific Fast-Fourier Transform, and all these depend on the structure of the vector ALU. However, the existing general schemes may only perform the butterfly operations in a base 2 Fast-Fourier Transform, and may not finish the butterfly operations in a base 3 Fast-Fourier Transform directly. Or the butterfly operations in a base 3 Fast-Fourier Transform may be finished by a combination of sets of complex addition and complex accumulation instructions, but this adds the number of instructions, reduces computational efficiency, and at the same time increases the difficulty of programming, thereby causing lower programming efficiency. By analyzing the above existing technologies, a main reason is in that when a traditional vector ALU performs the complex butterfly operations, it may not implement negation operation on results of multiplication flexibly, such that only fixed multiplication addition and multiplicative decrease may be performed on each butterfly branch, and as a result only the butterfly operations in a base 2 Fast-Fourier Transform may be completed.

SUMMARY

One of technical problems solved in the present disclosure is to propose a vector operation core which may flexibly implement various butterfly operations.

In order to solve the above technical problems, embodiments in the present disclosure provide a vector operation processor which may simultaneously support butterfly operations in the base 2, base 3 and base 5 Fast-Fourier Transform.

The vector operation core proposed in the present disclosure comprises: a first operation branch and a second operation branch; the first operation branch comprises: input ends 1, 2, 3, a multiplier 7, an either-or selector 9, negators 11, 12, a three-input adder 15 and an output end 17; the second operation branch comprises: input ends 4, 5, 6, a multiplier 8, an either-or selector 10, negators 13, 14, a three-input adder 16 and an output end 18; the negators 11, 12, 13, 14 are configured to control signs of their output data respectively; the data of input end 1 is input into one select input end of the selector 9, the data of input ends 2, 3 are input into two input ends of the multiplier 7, and the data outputted from the multiplier 7 is divided into two branches which are respectively input into input ends of the negators 11, 13; the data of input end 6 is input into one select input end of the selector 10, the data of the input ends 4, 5 are input into two input ends of multiplier 8, and the data outputted from multiplier 8 is divided into two branches which are respectively input into input ends of the negators 12, 14; the data outputted from the selector 9, the negators 11, 12 are respectively input into three input ends of the adder 15; the data outputted from the selector 10, the negators 13, 14 are respectively input into three input ends of the adder 16; the output data of the adder 15 is divided into two branches which are respectively input into the output 17 and the other select input end of the selector 9; the output data of the adder 16 is divided into two branches which are respectively input into the output 18 and the other select input end of the selector 10.

Further, one register is disposed respectively between the output end 1 and the selector 9 and between the input end 6 and the selector 10; one register is disposed respectively on output ends of the multiplier 7, 8 and output ends of the adder 15, 16.

The vector processor proposed in the present disclosure comprises: a control unit and the above vector operation core; the control unit is configured to control the input valid ends of the selectors 9, 10 in the vector operation core, and also configured to control the signs of output data of negators 11, 12, 13, 14 in the vector operation core.

Compared with the existing vector operation cores, because one two-input adder is saved and two two-input adders are replaced by one three-input adder, the vector operation core of the present disclosure reduces chip area and power dissipation. By using the vector processor of the present disclosure, the butterfly operations in base 2, base 3 and base 5 fast Fourier transform may be supported simultaneously; when simultaneously calculating two branches of base 2 butterfly operations, since the number of multiplications is reduced by half, circuit power dissipation is reduced largely.

DETAILED DESCRIPTION OF THE IMPLEMENTATION

The implementation of technical schemes of the present disclosure will be described in detail below in conjunction with the accompanying drawings and through particular embodiments.

Figure 1:
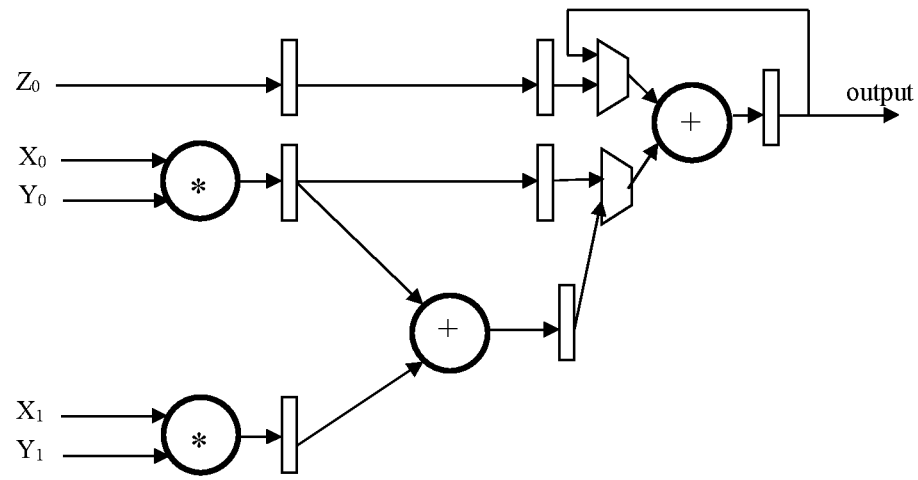
FIG. 1 shows a principal block diagram of a vector operation core in the prior art.
Figure 2:
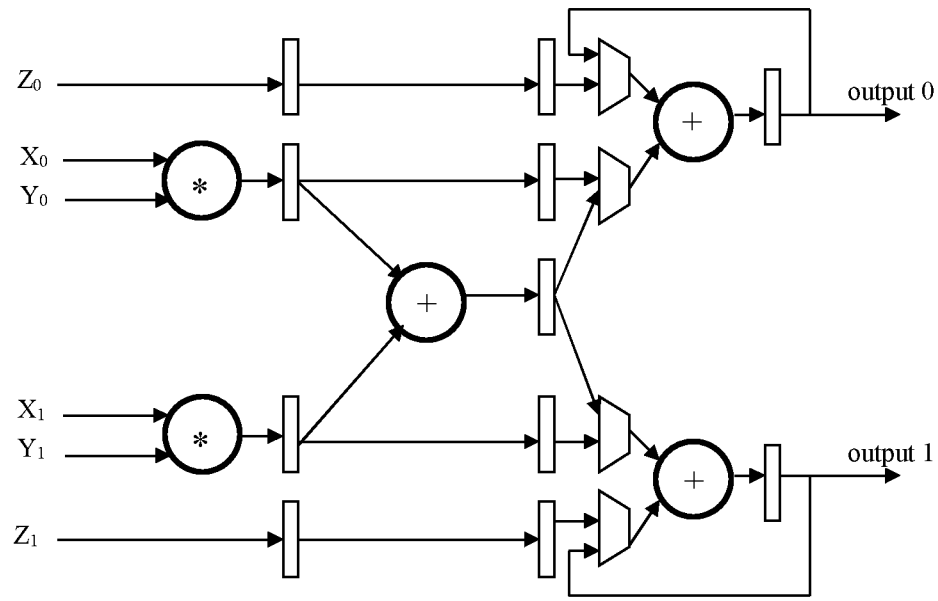
FIG. 2 shows a principal block diagram of another vector operation core in the prior art.

FIG. 1 shows an architecture of a vector operation core in the prior art, and the architecture shows a traditional one for the vector operation core, which is composed of two multipliers and two adders. FIG. 2 shows an architecture of another vector operation core in the prior art, and the architecture is composed of two multipliers and three adders. The vector processors constructed by the both existing vector operation cores may not realize the butterfly operations in base 2, base 3, base 5 Fast-Fourier Transform simultaneously.

Figure 3:
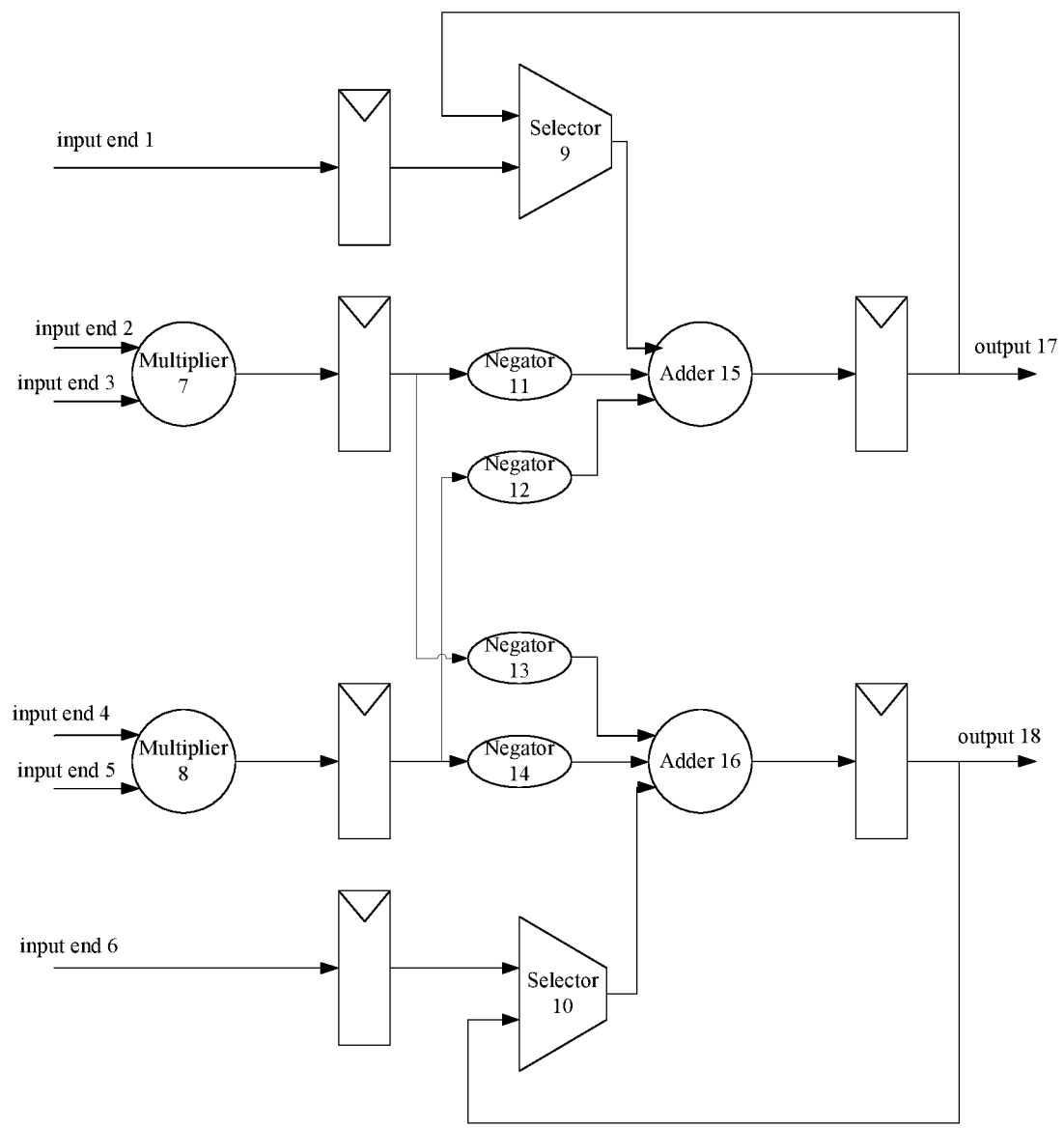
FIG. 3 shows a principal block diagram of a vector operation core according to an embodiment of the present disclosure.

FIG. 3 shows an architecture of a vector operation core according to an embodiment of the present disclosure, which utilizes two three-input adders and four data negators, such that the data input into the input adders may be negated flexibly, and the vector processor constructed by the vector operation core may simultaneously realize the butterfly operations in base 2, base 3, base 5 Fast-Fourier Transform. FIG. 3 shows the basic architecture of the vector operation core. In order to simplify the description, in the figure, the operation core is shown as only two stages, namely it is divided into three levels of pipelines to realize. In the practical hardware implementation, the operation core is realized by using different number of stages. The number of stages required to realize it depends on its highest operation frequency and a process utilized, for example, if a clock frequency requirement is 800 M, then the operation core is realized by three stages, namely it is divided into four levels of pipelines to realize, and if the clock frequency requirement is 200 M, then the operation core is divided into one level of pipeline to realize. That is to say, the number of levels of pipelines is based on the clock frequency requirement, and in this application only three levels of pipelines are taken as an example to describe.

As shown in FIG. 3, a first operation branch and a second operation branch are included in the vector operation core. The first operation branch comprises: input ends 1, 2, 3, multiplier 7, either-or selector 9, negators 11, 12, three-input adder 15 and output end 17; the second operation branch comprises: input ends 4, 5, 6, multiplier 8, either-or selector 10, negators 13, 14, three-input adder 16 and output end 18. The negators 11, 12, 13, 14 may perform flexible negation according to operation requirement.

Data of the input end 1 is input into one select input end of the selector 9, data of the input ends 2, 3 are input into two input ends of the multiplier 7, and data outputted from multiplier 7 is divided into two branches which are respectively input into input ends of the negators 11, 13; data of the input end 6 is input into one select input end of the selector 10, data of the input ends 4, 5 are input into two input ends of the multiplier 8, and data outputted from multiplier 8 is divided into two branches which are respectively input into input ends of the negators 12, 14; data outputted from the selector 9, negators 11, 12 is respectively input into three input ends of the adder 15; data outputted from the selector 10, negators 13, 14 is respectively input into three input ends of the adder 16; output data of the adder 15 is divided into two branches which are respectively input into output 17 and the other select input end of the selector 9; output data of the adder 16 is divided into two branches which are respectively input into the output 18 and the other select input end of the selector 10.

In one embodiment, one register is disposed respectively between the output end 1 and the selector 9 and between the input end 6 and the selector 10; one register is disposed respectively on the output ends of multiplier 7, 8 and the output ends of the adder 15, 16. As shown in FIG. 3, six registers are disposed totally.

The above vector operation core may be used as a core operation part of a vector processor, and the vector processor at least comprises: a control unit and a vector operation core described in claim for 2; the control unit is configured to control the valid input ends of the selectors 9, 10 in the vector operation core, and also configured to control the signs of output data of the negators 11, 12, 13, 14 in the vector operation core. Since the power dissipation of the vector operation core normally accounts for nearly half of power dissipation of the vector processor, and the above vector operation core reduces the number of operations and operation devices, the power dissipation of a vector processor using the above vector operation core will be reduced largely.

The butterfly operations in base 2, base 3, base 5 Fast-Fourier Transform will be taken respectively as an example, so as to specifically describe the operation processing procedure of the vector processor of the present disclosure.

1. Implementation of butterfly operations in base 2 Fast-Fourier Transform

The butterfly operations in base 2 Fast-Fourier Transform may be described as following:

$$X1=C+AB \tag{1a}$$

$$X2=C-AB \tag{1b}$$

where A, B and C are complex vectors, B is a rotation factor, and X1, X2 are output vectors of butterfly operations in base 2 Fast-Fourier Transform.

let $$A=Ar+jAi$$

$$B=Br+jBi$$

$$C=Cr+jCi$$

$$X1=X1r+jX1i$$

$$X2=X2r+jX2i$$

then formulas (1a), (1b) may be rewritten as:

$$X1r=Cr+[Ar*Br-Ai*Bi]$$

$$X2r=Cr-[Ar*Br-Ai*Bi] \tag{2}$$

$$X1i=Ci+[Ar*Bi+Ai*Br]$$

$$X2i=Ci-[Ar*Bi+Ai*Br] \tag{3}$$

where formula (2) is an expression of real parts of X1, X2, and formula (3) is an expression of imaginary parts of X1, X2.

Figure 4:
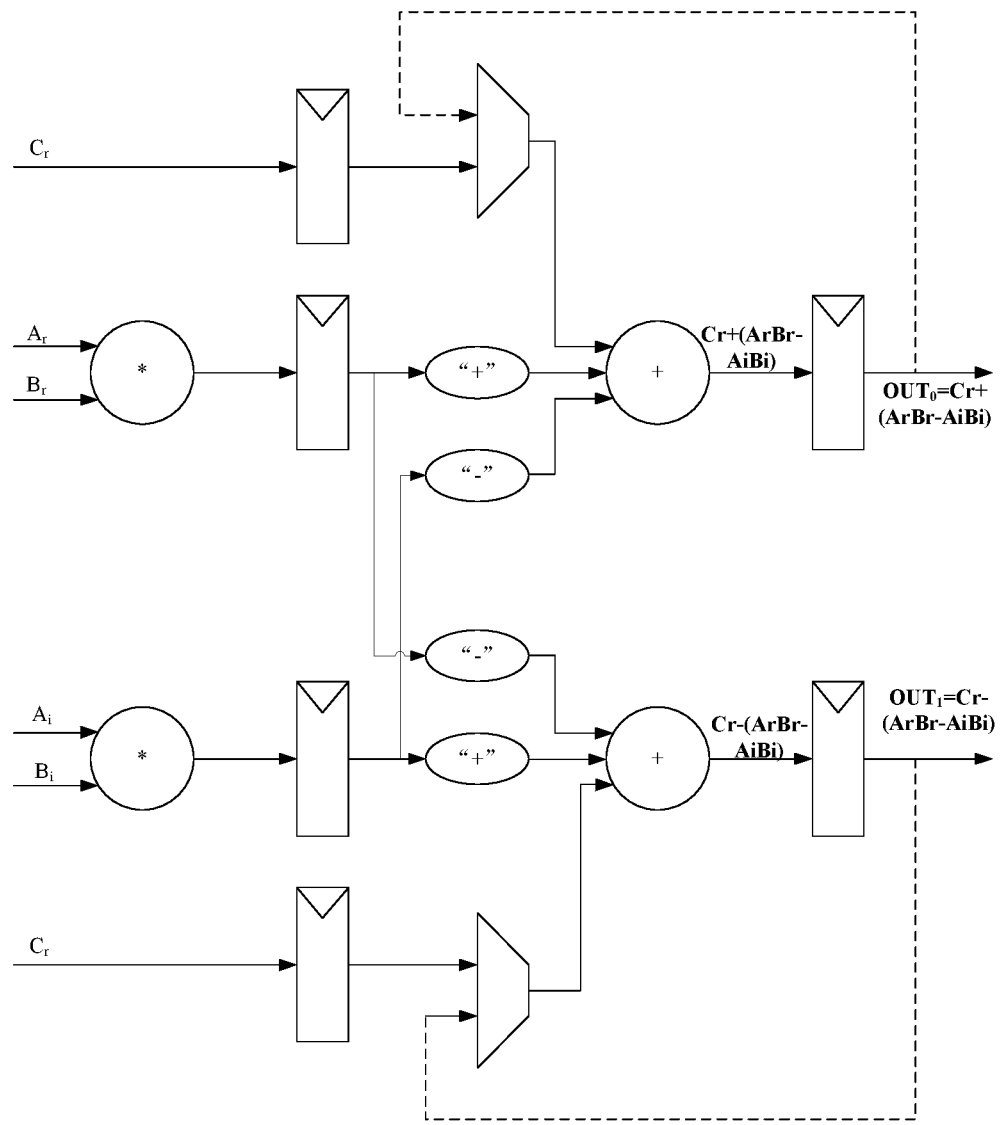
FIG. 4 shows an operation diagram of real parts of a base 2 Fast-Fourier Transform according to an embodiment of the present disclosure.

In the operation diagram of real parts shown in FIG. 4, solid lines indicate the direction of data flow, data Cr, Ar, Br, Ai, Bi, Cr are respectively input into the input ends 1, 2, 3, 4, 5, 6, the negators 11, 14 control signs of their output data to be positive, the negators 12, 13 control signs of their output data to be negative, the selector 9 selects data of the input end 1 as valid input data, the selector 10 selects data of the input end 6 as valid input data, output end 17 outputs an operation result X1r of real part of X1, and output end 18 outputs an operation result X2r of real part of X2.

Figure 5:
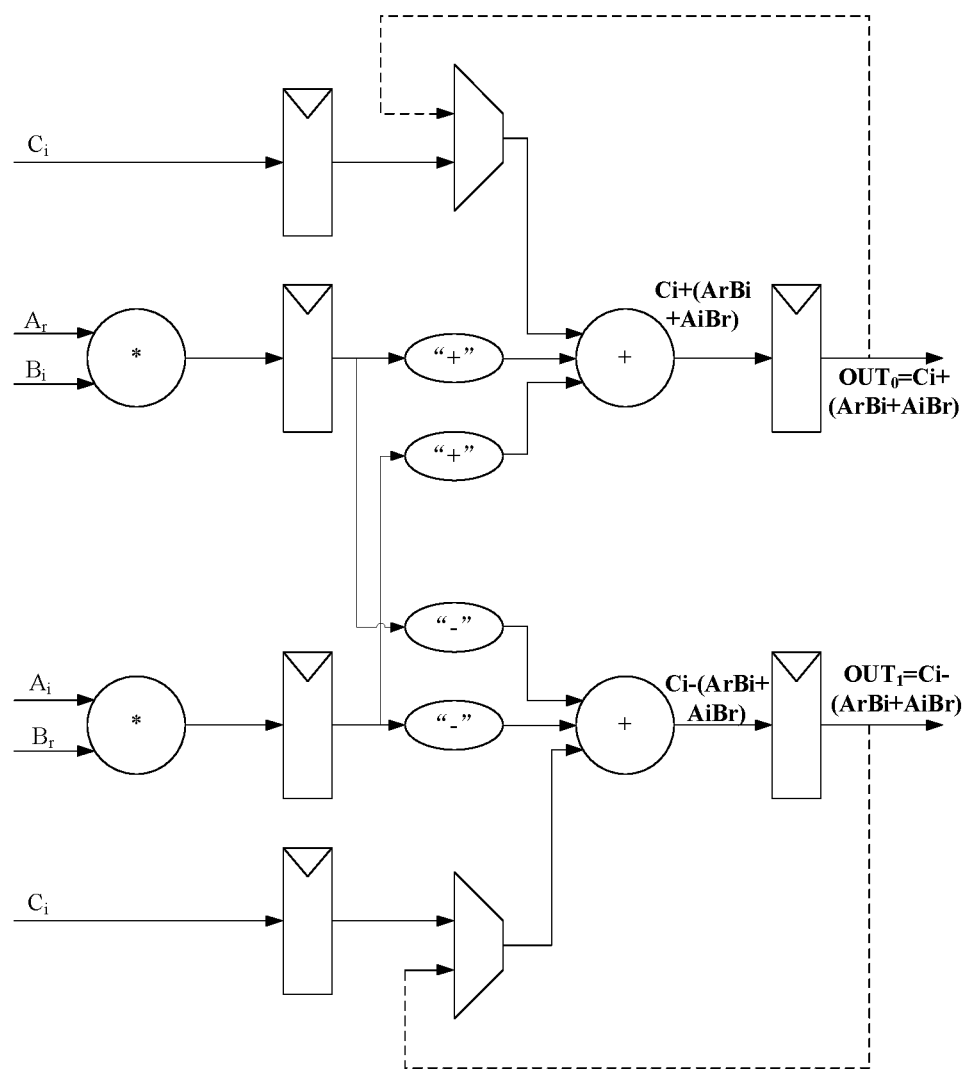
FIG. 5 shows an operation diagram of imaginary parts of a base 2 Fast-Fourier Transform according to an embodiment of the present disclosure.

In the operation diagram of imaginary parts shown in FIG. 5, solid lines indicate the direction of data flow, data Ci, Ar, Bi, Ai, Br, Ci are respectively input into the input ends 1, 2, 3, 4, 5, 6, the negators 11, 12 control signs of their output data to be positive, the negators 13, 14 control signs of their output data to be negative, the selector 9 selects data of the input end 1 as valid input data, the selector 10 selects data of input end 6 as valid input data, the output end 17 outputs an operation result X1i of imaginary part of X1, and output end 18 outputs an operation result X2i of imaginary part of X2.

2. Implementation of butterfly operations in base 3 Fast-Fourier Transform

The butterfly operations in base 3 Fast-Fourier Transform may be described as following:

$$X1=A+B+C \tag{4a}$$

$$X2=A+B*w1+C*w2 \tag{4b}$$

$$X3=A+B*conj(w1)+C*conj(w2) \tag{4c}$$

where A, B and C are complex vectors, w1, w2 are rotation factors, and X1, X2, X3 are output vectors of butterfly operations in base 3 Fast-Fourier Transform.

let $$A=Ar+jAi$$

$$B=Br+jBi$$

$$C=Cr+jCi$$

$$W1=W1r+jW1i$$

$$W2=W2r+jW2i$$

$$X1=X1r+jX1i$$

$$X2=X2r+jX2i$$

$$X3=X3r+jX3i$$

then formulas (4a), (4b), (4c) may be rewritten as:

$$X1r=Ar+Br+Cr$$

$$X1i=Ai+Bi+Ci \tag{5}$$

$$X2r=Ar+[Br*W1r-Bi*W1i]+[Cr*W2r-Ci*W2i]$$

$$X3r=Ar+[Br*W1r+Bi*W1i]+[Cr*W2r+Ci*W2i] \tag{6}$$

$$X2i=Ai+[Br*W1i+Bi*W1r]+[Cr*W2i+Ci*W2r]$$

$$X3i=Ai+[-Br*W1i+Bi*W1r]+[-Cr*W2i+Ci*W2r] \tag{7}$$

The implementation of formula (5) may be completed by addition and accumulation instructions, and the optimization of the present disclosure mainly aims at formula (6) and formula (7).

Figure 6A:
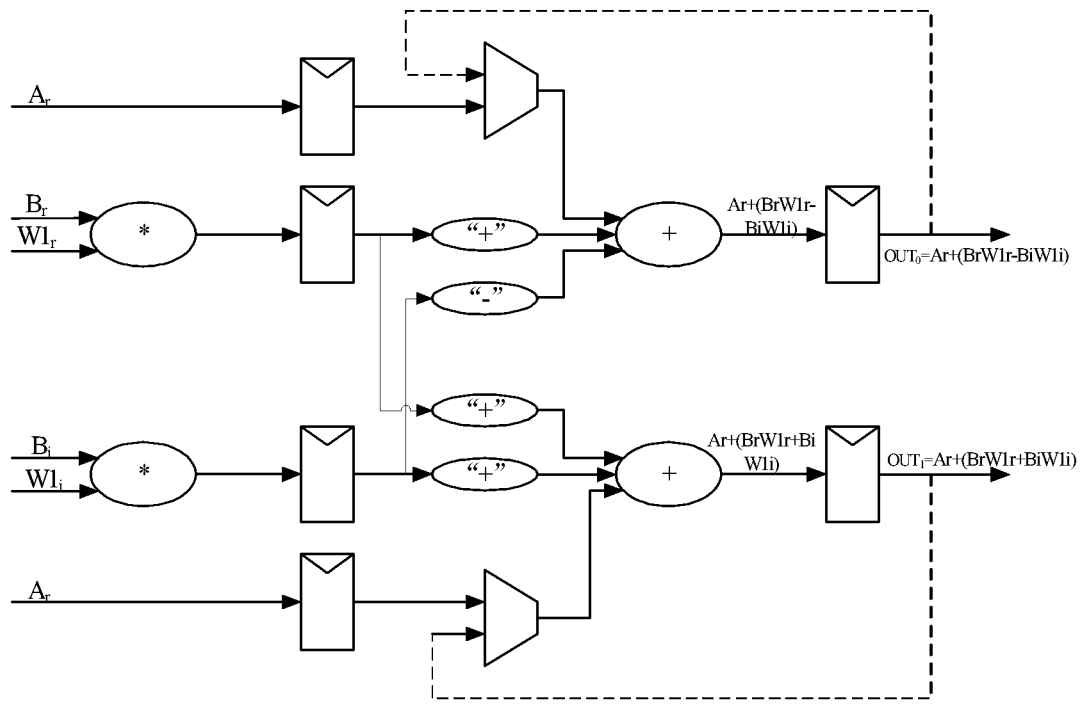
FIG. 6a shows a first time operation diagram of real parts of a base 3 Fast-Fourier Transform according to an embodiment of the present disclosure.
Figure 6B:
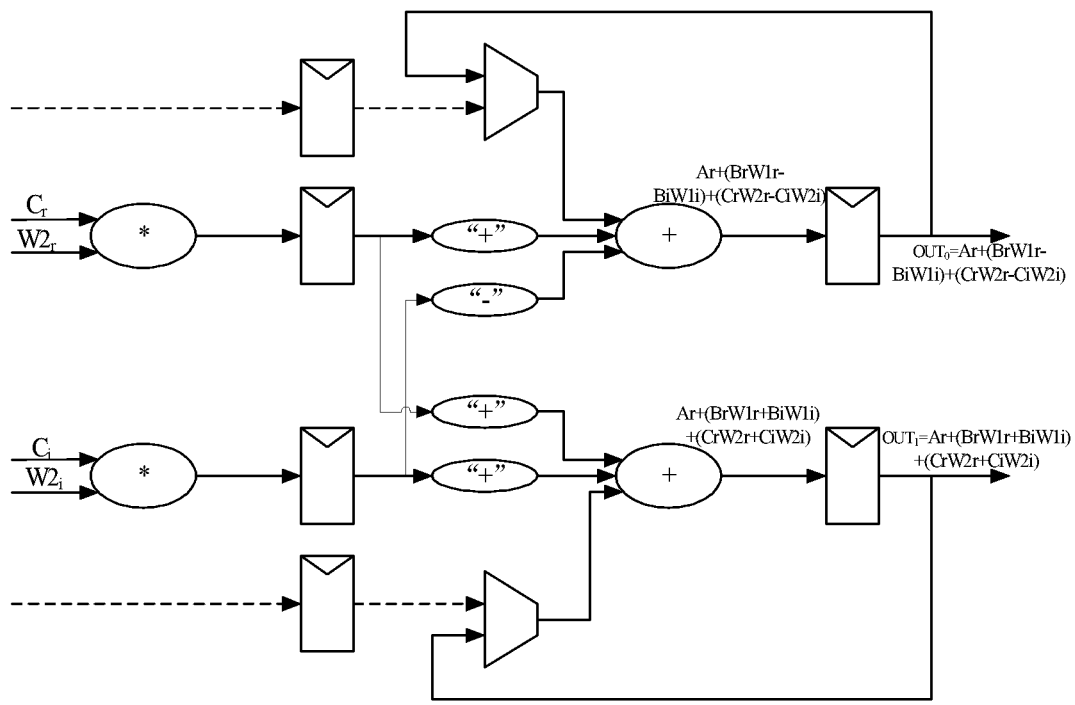
FIG. 6b shows a second time operation diagram of real parts of a base 3 Fast-Fourier Transform according to an embodiment of the present disclosure.

The operation of real parts shown in FIG. 6 comprises twice operation procedures, FIG. 6a shows a first time operation diagram, and FIG. 6b shows a second time operation diagram, with solid lines indicating the direction of data flow. In the first time operation, data Ar, Br, W1r, Bi, W1i, Ar are respectively input into input ends 1, 2, 3, 4, 5, 6, negators 11, 13, 14 control signs of their output data to be positive, negator 12 controls signs of its output data to be negative, selector 9 selects data of the input end 1 as valid input data, selector 10 selects data of the input end 6 as valid input data, the operation result outputted from output end 17 is used as input data selected by the selector 9 in the second time operation, and the operation result outputted from the output end 18 is used as input data selected by selector 10 in the second time operation; in the second time operation, data Cr, W2r, Ci, W2i are respectively input into input ends 2, 3, 4, 5, negators 11, 13, 14 control signs of their output data to be positive, negator 12 controls sign of its output data to be negative, selector 9 selects the operation result, in the first time operation, outputted from output end 17 as valid input data, and selector 10 selects the operation result, in the first time operation, outputted from output end 18 as valid input data; the second time operation result outputted from output end 17 is used as operation result X2r of real part of X2, and the second time operation result outputted from output end 18 is used as an operation result X3r of real part of X3.

Figure 7A:
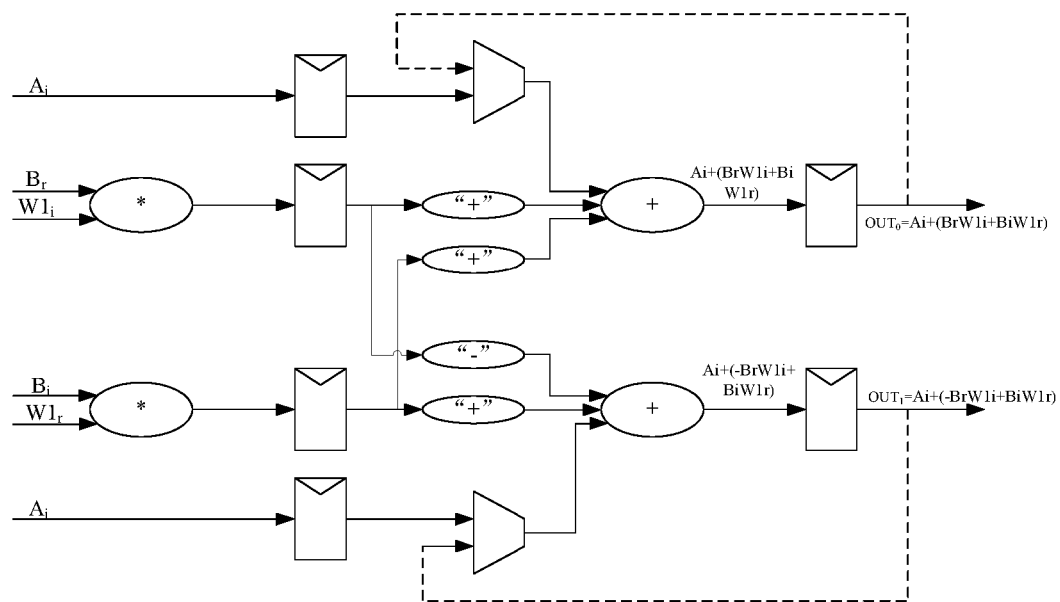
FIG. 7a shows a first time operation diagram of imaginary parts of a base 3 Fast-Fourier Transform according to an embodiment of the present disclosure.
Figure 7B:
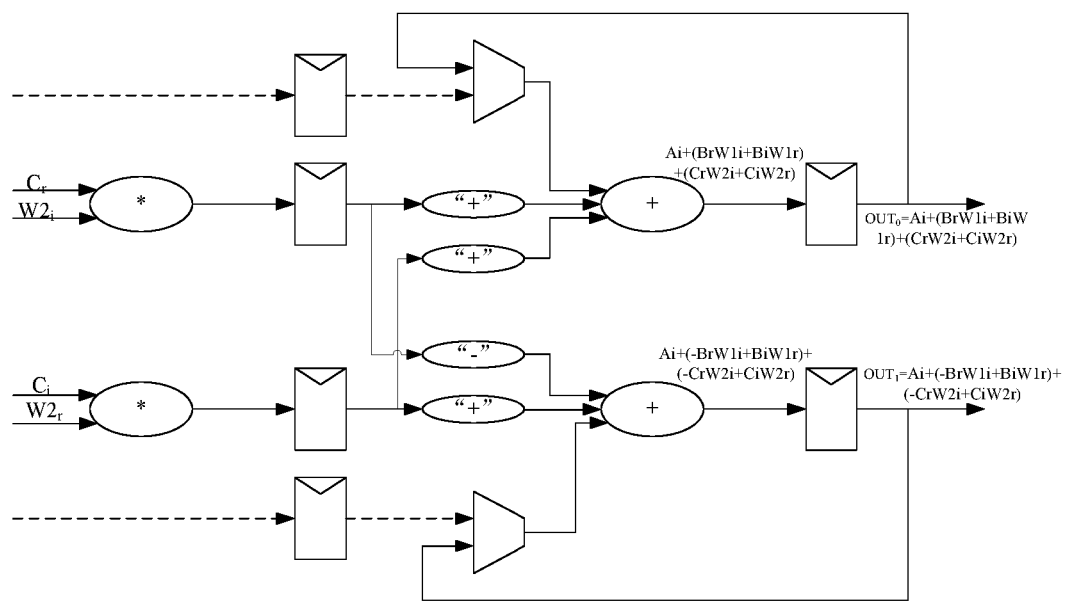
FIG. 7b shows a second time operation diagram of imaginary parts of a base 3 Fast-Fourier Transform according to an embodiment of the present disclosure.
Figure 8A:
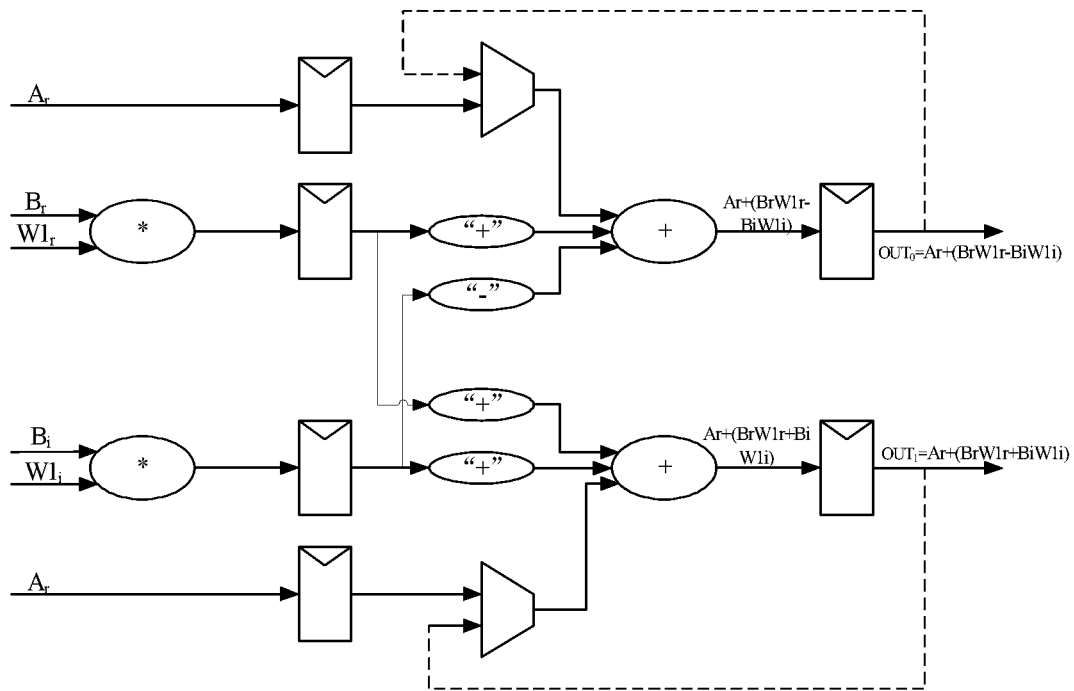
FIG. 8a shows a first time operation diagram of real parts of X2, X3 of a base 5 Fast-Fourier Transform according to an embodiment of the present disclosure.
Figure 8B:
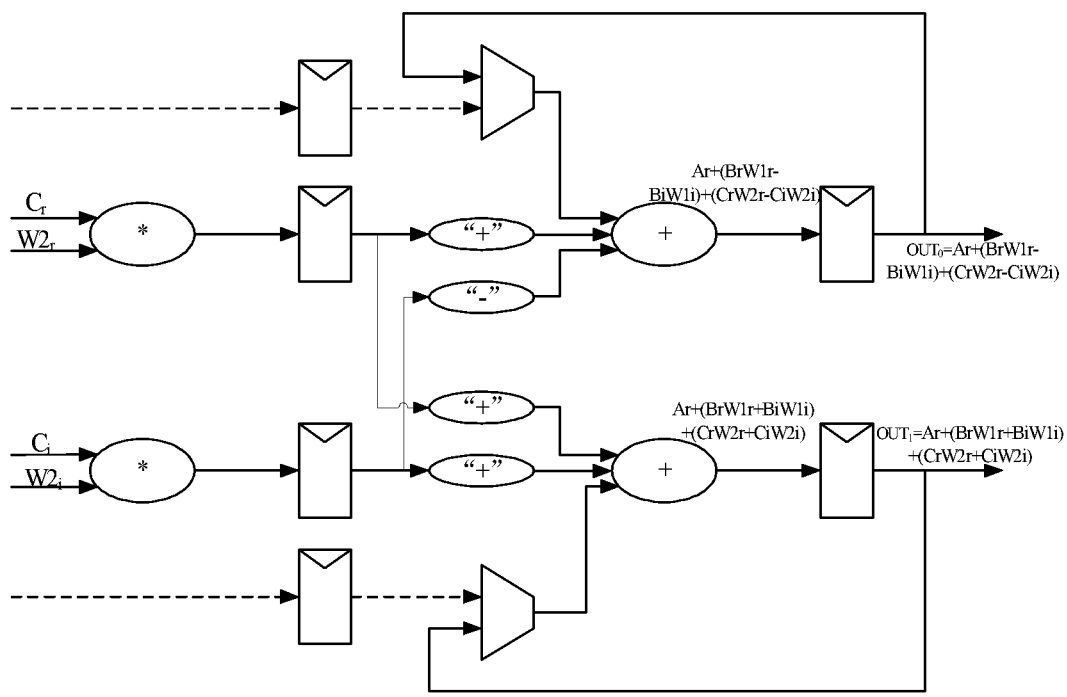
FIG. 8b shows a second time operation diagram of real parts of X2, X3 of a base 5 Fast-Fourier Transform according to an embodiment of the present disclosure.
Figure 8C:
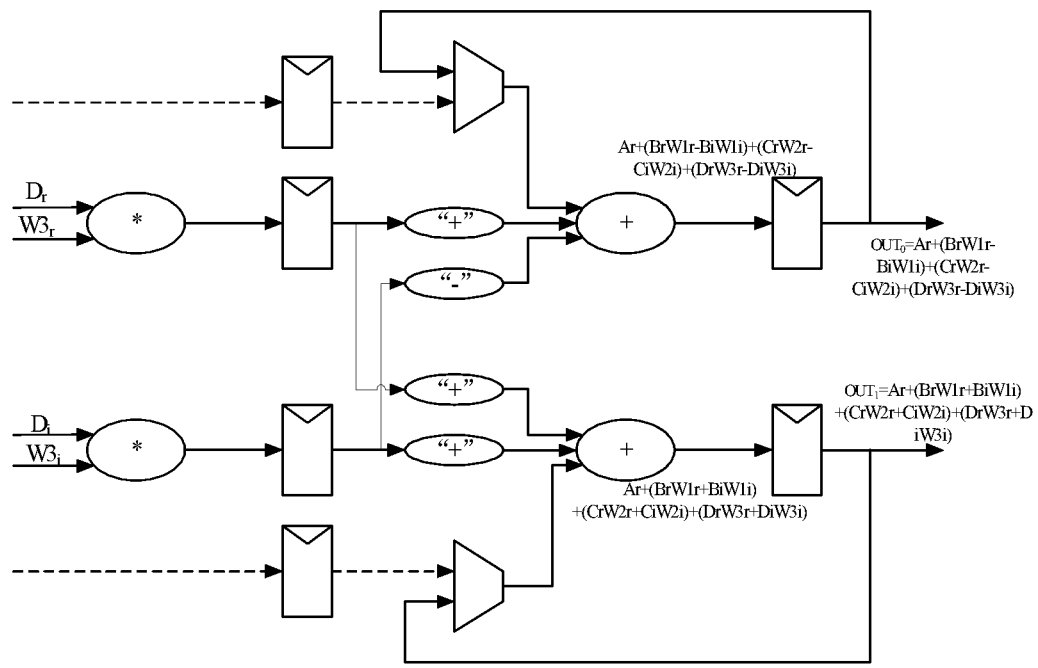
FIG. 8c shows a third time operation diagram of real parts of X2, X3 of a base 5 Fast-Fourier Transform according to an embodiment of the present disclosure.
Figure 8D:
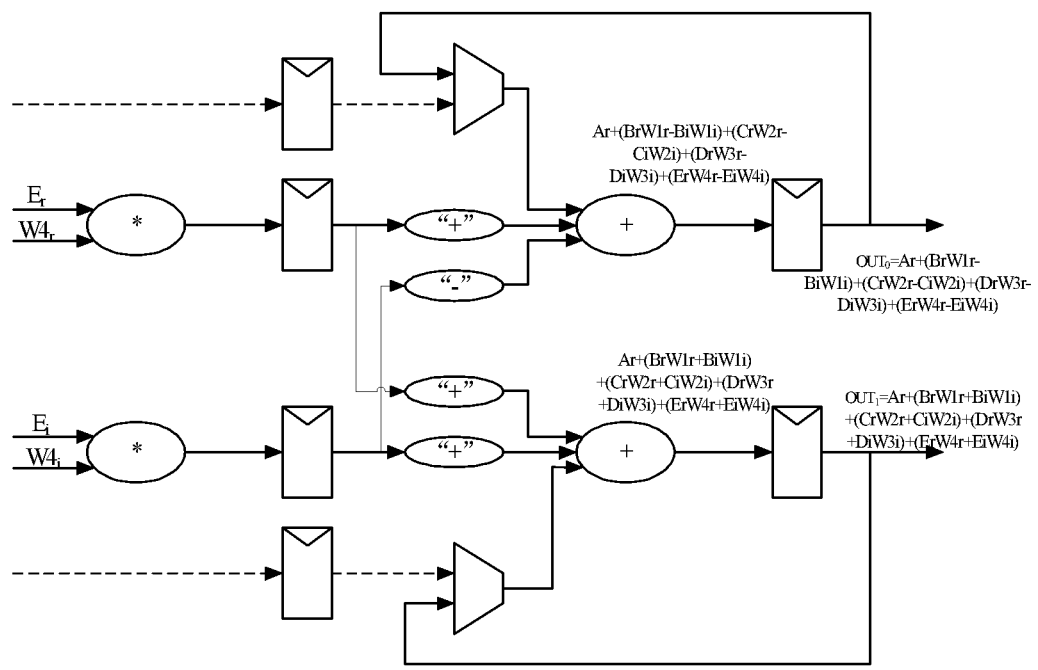
FIG. 8d shows a fourth time operation diagram of real parts of X2, X3 of a base 5 Fast-Fourier Transform according to an embodiment of the present disclosure.
Figure 9A:
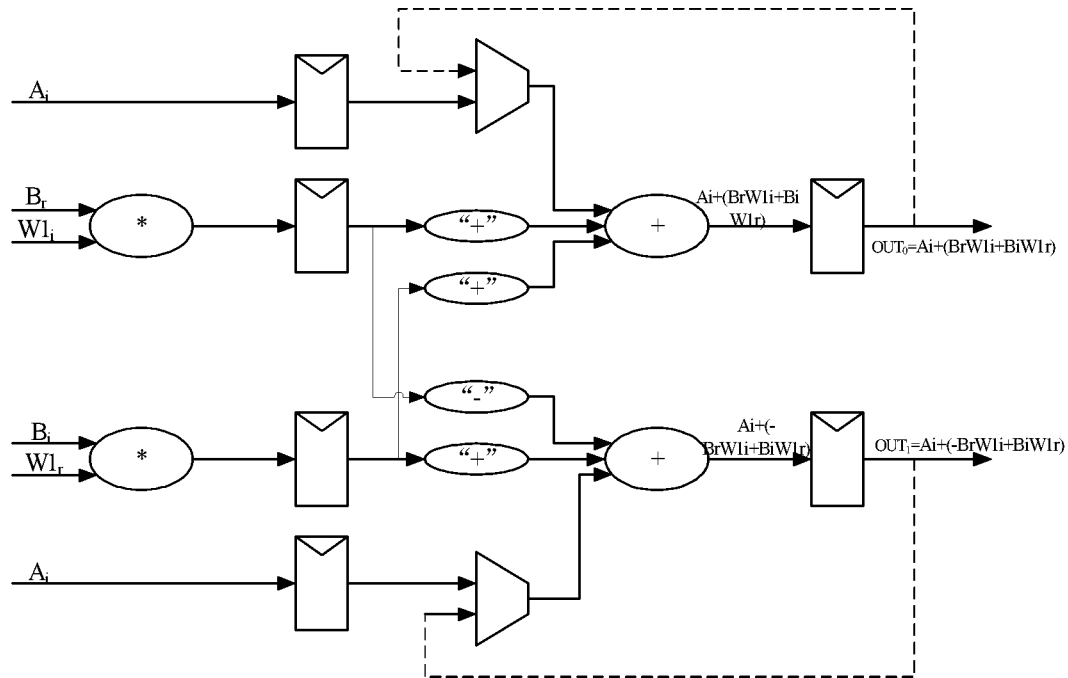
FIG. 9a shows a first time operation diagram of imaginary parts of X2, X3 of a base 5 Fast-Fourier Transform according to an embodiment of the present disclosure.
Figure 9B:
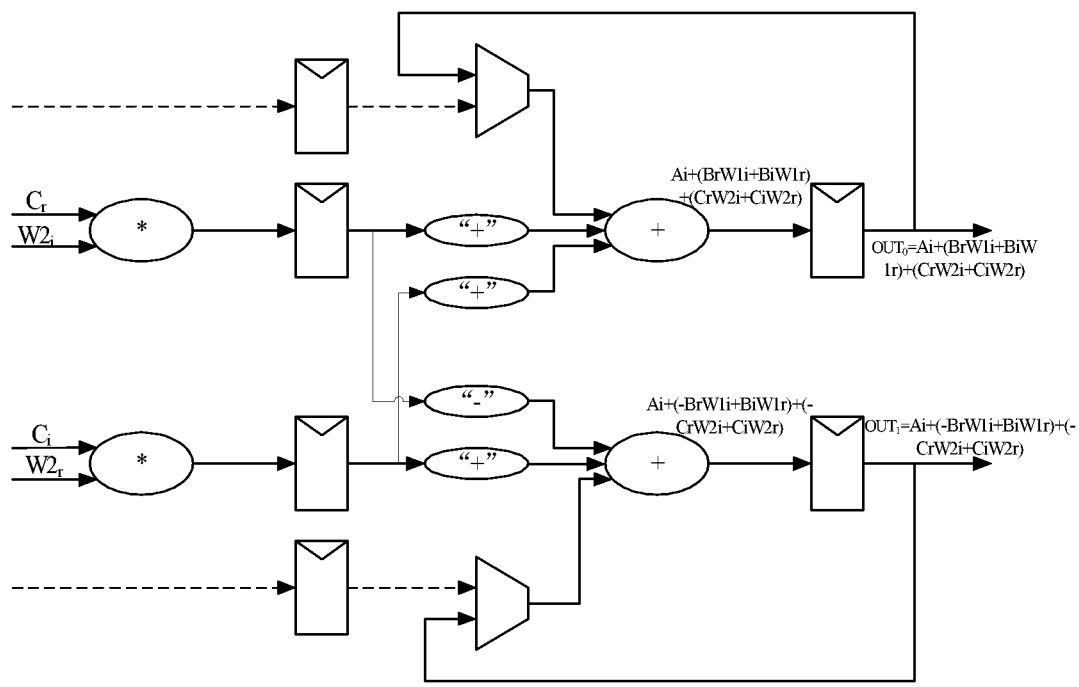
FIG. 9b shows a second time operation diagram of imaginary parts of X2, X3 of a base 5 Fast-Fourier Transform according to an embodiment of the present disclosure.
Figure 9C:
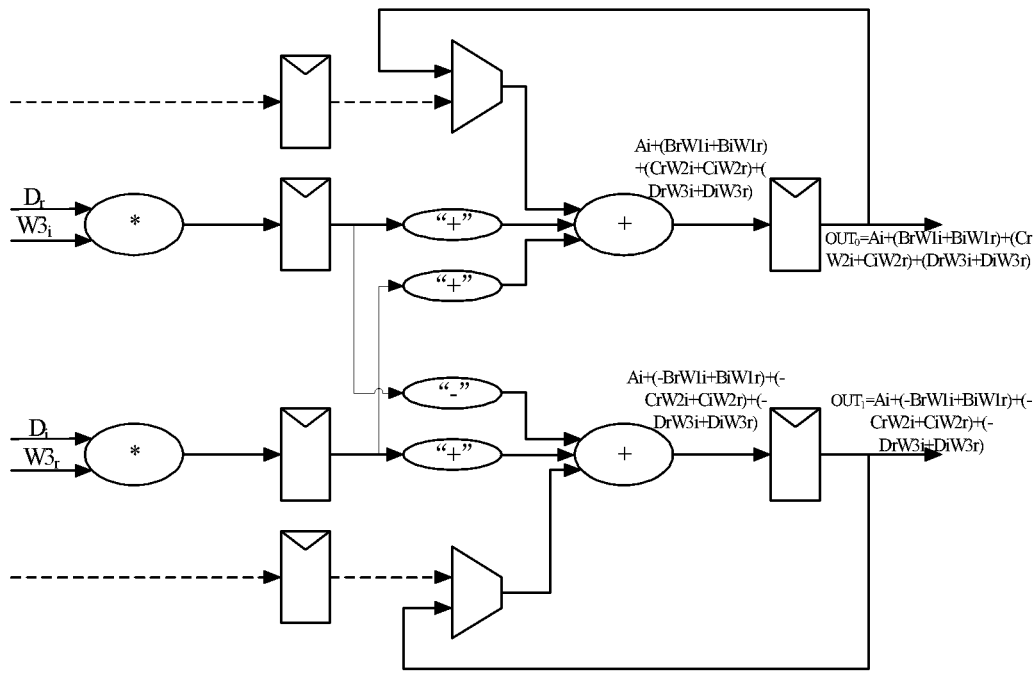
FIG. 9c shows a third time operation diagram of imaginary parts of X2, X3 of a base 5 Fast-Fourier Transform according to an embodiment of the present disclosure.
Figure 9D:
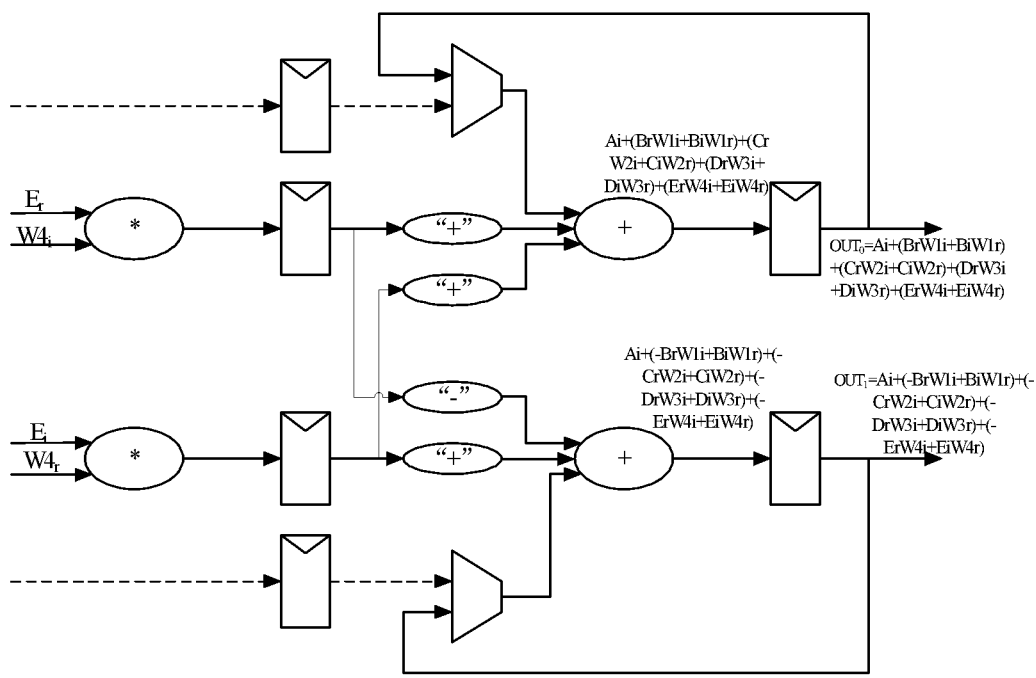
FIG. 9d shows a fourth time operation diagram of imaginary parts of X2, X3 of a base 5 Fast-Fourier Transform according to an embodiment of the present disclosure.
Figure 10A:
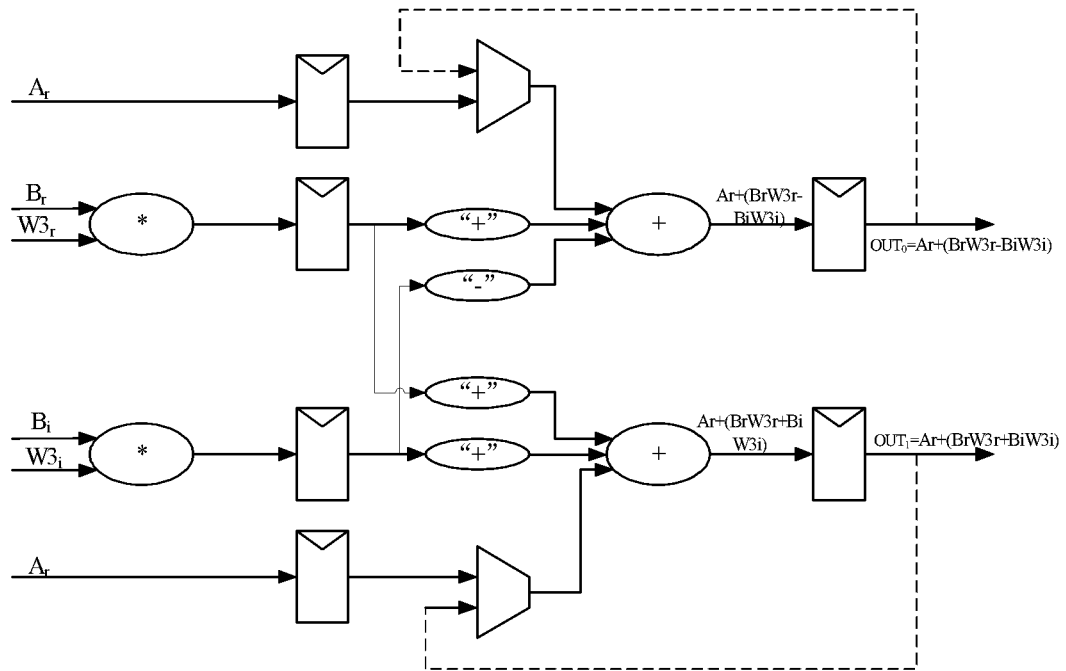
FIG. 10a shows a first time operation diagram of real parts of X4, X5 of a base 5 Fast-Fourier Transform according to an embodiment of the present disclosure.
Figure 10B:
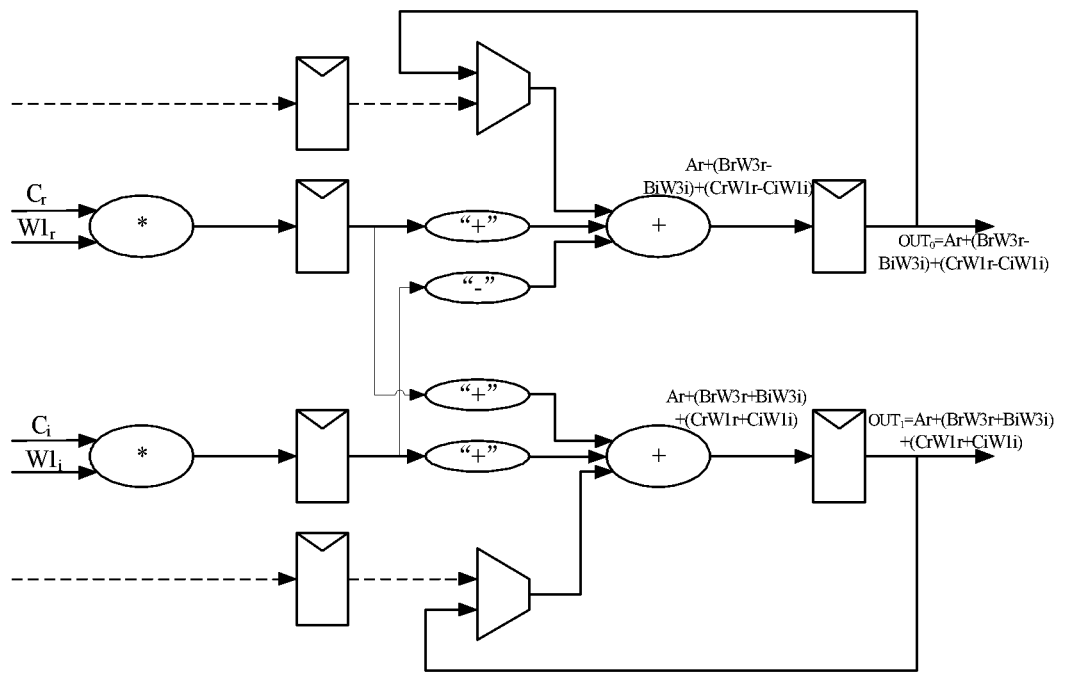
FIG. 10b shows a second time operation diagram of real parts of X4, X5 of a base 5 Fast-Fourier Transform according to an embodiment of the present disclosure.
Figure 10C:
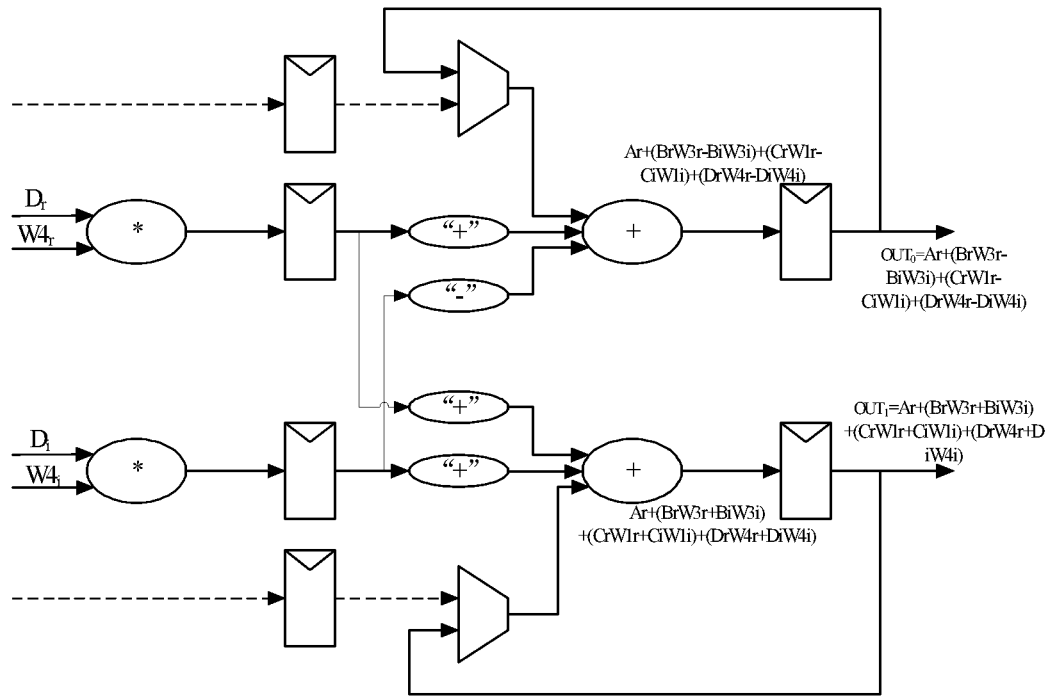
FIG. 10c shows a third time operation diagram of real parts of X4, X5 of a base 5 Fast-Fourier Transform according to an embodiment of the present disclosure.
Figure 10D:
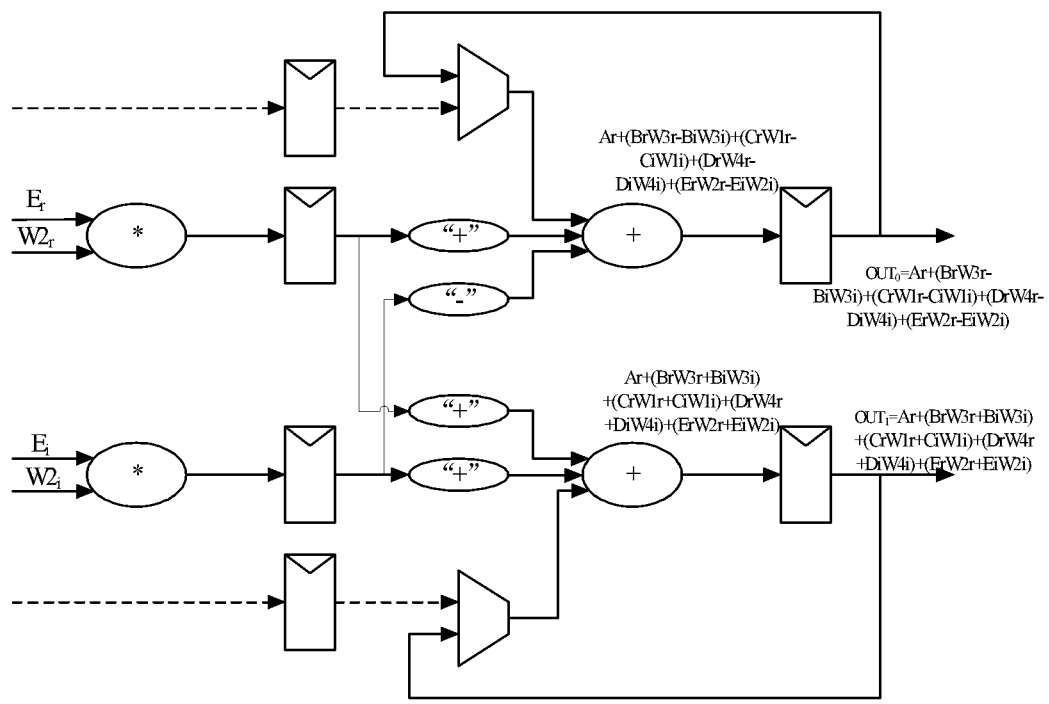
FIG. 10d shows a fourth time operation diagram of real parts of X4, X5 of a base 5 Fast-Fourier Transform according to an embodiment of the present disclosure.
Figure 11A:
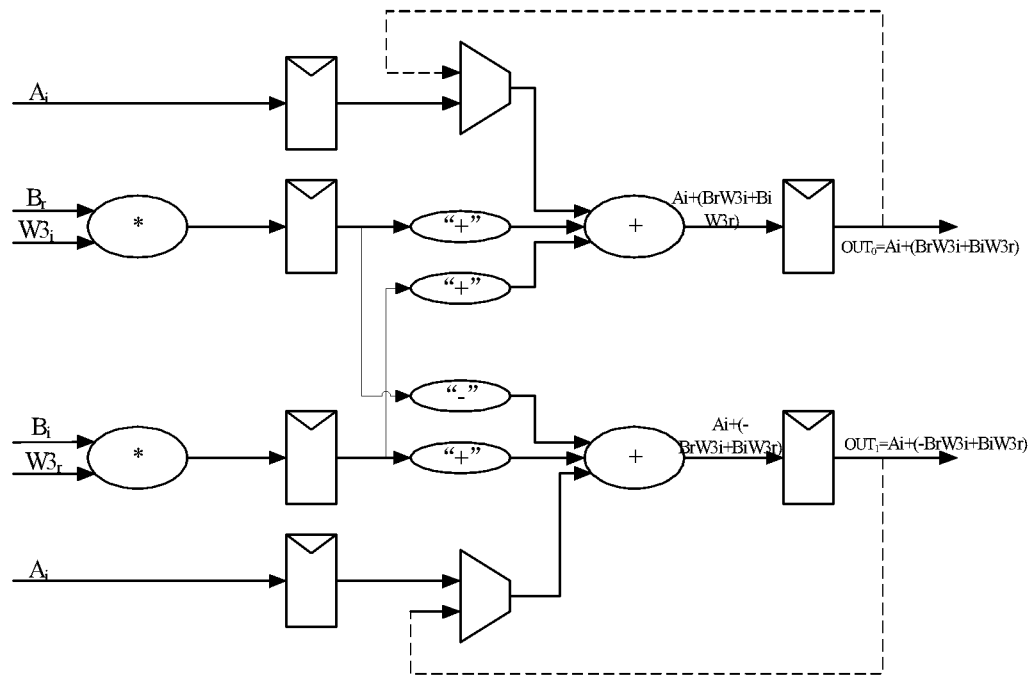
FIG. 11a shows a first time operation diagram of imaginary parts of X4, X5 of a base 5 Fast-Fourier Transform according to an embodiment of the present disclosure.
Figure 11B:
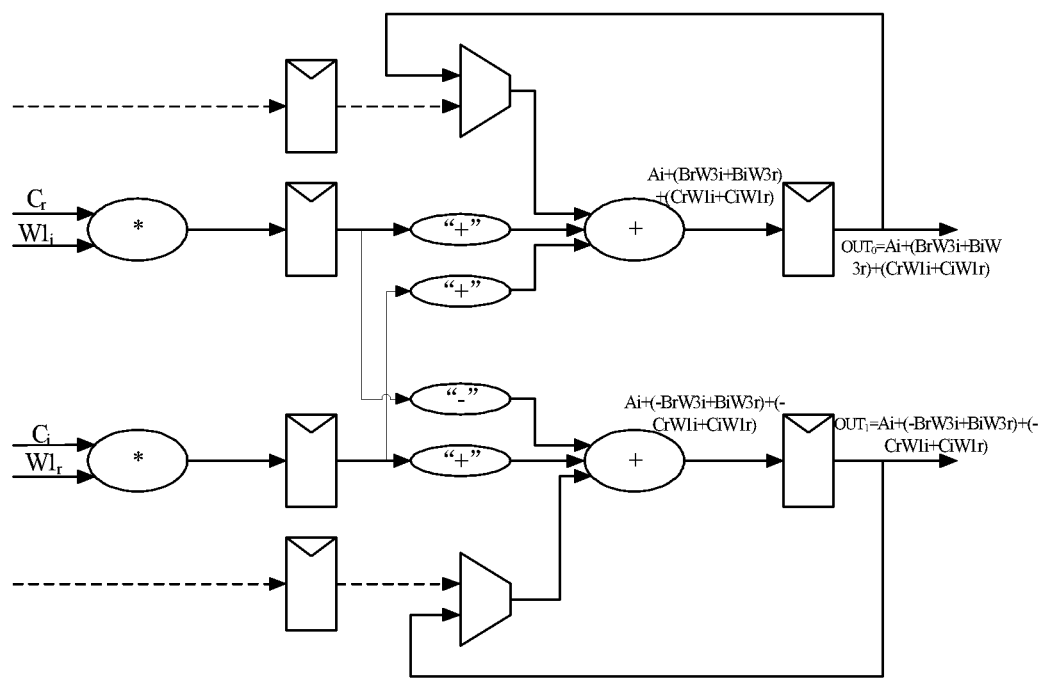
FIG. 11b shows a second time operation diagram of imaginary parts of X4, X5 of a base 5 Fast-Fourier Transform according to an embodiment of the present disclosure.
Figure 11C:
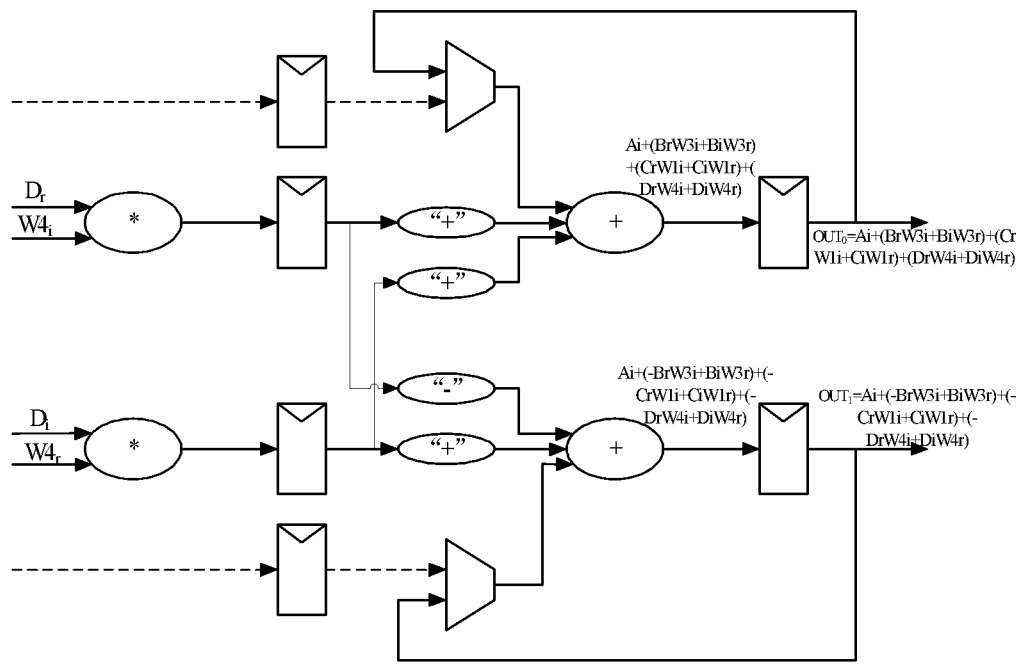
FIG. 11c shows a third time operation diagram of imaginary parts of X4, X5 of a base 5 Fast-Fourier Transform according to an embodiment of the present disclosure.
Figure 11D:
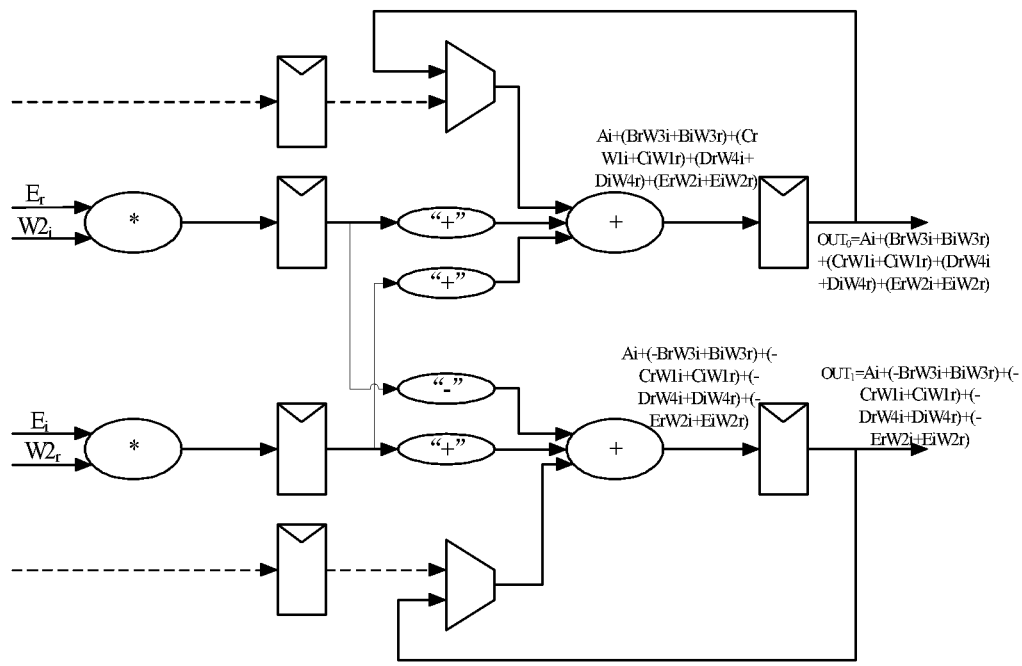
FIG. 11d shows a fourth time operation diagram of imaginary parts of X4, X5 of a base 5 Fast-Fourier Transform according to an embodiment of the present disclosure.

The operation of imaginary parts shown in FIG. 7 comprises twice operation procedures, FIG. 7a shows a first time operation diagram, and FIG. 7b shows a second time operation diagram. In the first time operation, data Ai, Br, W1i, Bi, W1r, Ai are respectively input into input ends 1, 2, 3, 4, 5, 6, negators 11, 12, 14 control signs of their output data to be positive, negator 13 controls a sign of its output data to be negative, selector 9 selects data of input end 1 as valid input data, selector 10 selects data of input end 6 as valid input data, the operation result outputted from output end 17 is used as input data selected by the selector 9 in the second time operation, and the operation result outputted from output end 18 is used as input data selected by the selector 10 in the second time operation; in the second time operation, data Cr, W2i, Ci, W2r are respectively input into input ends 2, 3, 4, 5, negators 11, 12, 14 control signs of their output data to be positive, negator 13 controls a sign of its output data to be negative, selector 9 selects the operation result, in the first time operation, outputted from output end 17 as valid input data, and selector 10 selects the operation result, in the first time operation, outputted from output end 18 as valid input data; the second time operation result outputted from output end 17 is used as an operation result X2i of imaginary part of X2, and the second time operation result outputted from output end 18 is used as an operation result X3i of imaginary part of X3.

3. Implementation of Butterfly Operations in Base 5 Fast-Fourier Transform

The butterfly operations in base 5 Fast-Fourier Transform may be described as following:

$$X1=A+B+C+D+E \tag{8a}$$

$$X2=A+B^*w1+C^*w2+D^*w3+E^*w4 \tag{8b}$$

$$X3=A+B^*\text{conj}(w1)+C^*\text{conj}(w2)+D^*\text{conj}(w3)+E^*\text{conj}(w4) \tag{8c}$$

$$X4=A+B^*w3+C^*w1+D^*w4+E^*w2 \tag{8d}$$

$$X5=A+B^*\text{conj}(w3)+C^*\text{conj}(w1)+D^*\text{conj}(w4)+E^*\text{conj}(w2) \tag{8e}$$

where A, B, C, D and E are complex vectors, w1, w2, w3, w4 are rotation factors, and X1, X2, X3, X4, X5 are output vectors of butterfly operations in base 5 Fast-Fourier Transform.

let $$A=Ar+jAi$$

$$B=Br+jBi$$

$$C=Cr+jCi$$

$$D=Dr+jDi$$

$$E=Er+jEi$$

$$W1=W1r+jW1i$$

$$W2=W2r+jW2i$$

$$W3=W3r+jW3i$$

$$W4=W4r+jW4i$$

$$X1=X1r+jX1i$$

$$X2=X2r+jX2i$$

$$X3=X3r+jX3i$$

$$X4=X4r+jX4i$$

$$X5=X5r+jX5i$$

then formulas (8a), (8b), (8c), (8d), (8e) may be rewritten as:

$$X1r=Ar+Br+Cr+Dr+Er$$

$$X1i=Ai+Bi+Ci+Di+Ei \tag{9}$$

$$X2r=Ar+[Br^*W1r-Bi^*W1i]+[Cr^*W2r-Ci^*W2i]+[Dr^*W3r-Di^*W3i]+[Er^*W4r-Ei^*W4i]$$

$$X3r=Ar+[Br^*W1r+Bi^*W1i]+[Cr^*W2r+Ci^*W2i]+[Dr^*W3r+Di^*W3i]+[Er^*W4r+Ei^*W4i] \tag{10}$$

$$X2i=Ai+[Br^*W1i+Bi^*W1r]+[Cr^*W2i+Ci^*W2r]+[Dr^*W3i+Di^*W3r]+[Er^*W4i+Ei^*W4r]$$

$$X3i=Ai+[-Br^*W1i+Bi^*W1r]+[-Cr^*W2i+Ci^*W2r]+[-Dr^*W3i+Di^*W3r]+[-Er^*W4i+Ei^*W4r] \tag{11}$$

$$X4r=Ar+[Br^*W3r-Bi^*W3i]+[Cr^*W1r-Ci^*W1i]+[Dr^*W4r-Di^*W4i]+[Er^*W2r-Ei^*W2i]$$

$$X5r=Ar+[Br^*W3r+Bi^*W3i]+[Cr^*W1r+Ci^*W1i]+[Dr^*W4r+Di^*W4i]+[Er^*W2r+Ei^*W2i] \tag{12}$$

$$X4i=Ai+[Br^*W3i+Bi^*W3r]+[Cr^*W1i+Ci^*W1r]+[Dr^*W4i+Di^*W4r]+[Er^*W2i+Ei^*W2r]$$

$$X5i=Ai+[-Br^*W3i+Bi^*W3r]+[-Cr^*W1i+Ci^*W1r]+[-Dr^*W4i+Di^*W4r]+[-Er^*W2i+Ei^*W2r] \tag{13}$$

It may be seen from formulas (9), (10), (11), (12), (13), their processing modes are similar to those of formulas (5), (6), (7). Particular processing procedure is that: formula (9) is completed by using addition and accumulation instructions.

The processing of formula (10) is shown in FIG. 8, which comprises four operations, respectively shown in operation diagram 8a, operation diagram 8b, operation diagram 8c and operation diagram 8d, with solid lines indicating the direction of data flow. In the first time operation, data Ar, Br, W1r, Bi, W1i, Ar are respectively input into input ends 1, 2, 3, 4, 5, 6, negators 11, 13, 14 control signs of their output data to be positive, negator 12 controls a sign of its output data to be negative, selector 9 selects data of input end 1 as valid input data, selector 10 selects data of input end 6 as valid input data, the operation result outputted from output end 17 is used as input data selected by the selector 9 in the second time operation, and the operation result outputted from output end 18 is used as input data selected by the selector 10 in the second time operation; in the second time operation, data Cr, W2r, Ci, W2i are respectively input into input ends 2, 3, 4, 5, negators 11, 13, 14 control signs of their output data to be positive, negator 12 controls a sign of its output data to be negative, selector 9 selects the operation result, in the first time operation, outputted from the output end 17 as valid input data, selector 10 selects the operation result, in the first time operation, outputted from output end 18 as valid input data, the operation result outputted from output end 17 is used as input data selected by the selector 9 in the third time operation, and the operation result outputted from output end 18 is used as input data selected by the selector 10 in the third time operation; in the third time operation, data Dr, W3r, Di, W3i are respectively input into input ends 2, 3, 4, 5, negators 11, 13, 14 control signs of their output data to be positive, negator 12 controls a sign of its output data to be negative, selector 9 selects the operation result, in the second time operation, outputted from the output end 17 as valid input data, selector 10 selects the operation result, in the second time operation, outputted from output end 18 as valid input data, the operation result outputted from output end 17 is used as input data selected by the selector 9 in the fourth time operation, and the operation result outputted from output end 18 is used as input data selected by the selector 10 in the fourth time operation; in the fourth time operation, data Er, W4r, Ei, W4i is respectively input into input ends 2, 3, 4, 5, negators 11, 13, 14 control signs of their output data to be positive, negator 12 controls a sign of its output data to be negative, selector 9 selects the operation result, in the third time operation, outputted from output end 17 as valid input data, and selector 10 selects the operation result, in the third time operation, outputted from output end 18 as valid input data; the fourth time operation result outputted from output end 17 is used as an operation result X2r of real part of X2, and the fourth time operation result outputted from output end 18 is used as an operation result X3r of real part of X3.

The processing of formula (11) is shown in FIG. 9, which comprises four operations respectively shown in diagram 9a, operation diagram 9b, operation diagram 9c and operation diagram 9d, with solid lines indicating the direction of data flow. In the first time operation, data Ai, Br, W1i, Bi, W1r, Ai are respectively input into input ends 1, 2, 3, 4, 5, 6, negators 11, 12, 14 control signs of their output data to be positive, negator 13 controls a sign of its output data to be negative, selector 9 selects data of input end 1 as valid input data, selector 10 selects data of input end 6 as valid input data, the operation result outputted from output end 17 is used as input data selected by the selector 9 in the second time operation, and the operation result outputted from output end 18 is used as input data selected by the selector 10 in the second time operation; in the second time operation, data Cr, W2i, Ci, W2r are respectively input into input ends 2, 3, 4, 5, negators 11, 12, 14 control signs of their output data to be positive, negator 13 controls a sign of its output data to be negative, selector 9 selects the operation result, in the first time operation, outputted from output end 17 as valid input data, selector 10 selects the operation result, in the first time operation, outputted from output end 18 as valid input data, the operation result outputted from output end 17 is used as input data selected by the selector 9 in the third time operation, and the operation result outputted from output end 18 is used as input data selected by the selector 10 in the third time operation; in the third time operation, data Dr, W3i, Di, W3r are respectively input into input ends 2, 3, 4, 5, negators 11, 12, 14 control signs of their output data to be positive, negator 13 controls a sign of its output data to be negative, selector 9 selects the operation result, in the second time operation, outputted from output end 17 as valid input data, selector 10 selects the operation result, in the second time operation, outputted from output end 18 as valid input data, the operation result outputted from output end 17 is used as input data selected by the selector 9 in the fourth time operation, and the operation result outputted from output end 18 is used as input data selected by the selector 10 in the fourth time operation; in the fourth time operation, data Er, W4i, Ei, W4r are respectively input into input ends 2, 3, 4, 5, negators 11, 12, 14 control signs of their output data to be positive, negator 13 controls a sign of its output data to be negative, selector 9 selects an operation result, in the third time operation, outputted from output end 17 as valid input data, and selector 10 selects the operation result outputted from the third time operation of output end 18 as valid input data; the fourth time operation result outputted from output end 17 is used as an operation result X2i of imaginary part of X2, and the fourth time operation result outputted from output end 18 is used as an operation result X3i of imaginary part of X3.

The processing of formula (12) is shown in FIG. 10, which comprises four operations respectively shown in operation diagram 10a, operation diagram 10b, operation diagram 10c and operation diagram 10d, with solid lines indicating the direction of data flow. In the first time operation, data Ar, Br, W3r, Bi, W3i, Ar are respectively input into input ends 1, 2, 3, 4, 5, 6, negators 11, 13, 14 control signs of their output data to be positive, negator 12 controls a sign of its output data to be negative, selector 9 selects data of input end 1 as valid input data, selector 10 selects data of input end 6 as valid input data, the operation result outputted from output end 17 is used as input data selected by the selector 9 in the second time operation, and the operation result outputted from output end 18 is used as input data selected by the selector 10 in the second time operation; in the second time operation, data Cr, W1r, Ci, W1i are respectively input into input ends 2, 3, 4, 5, negators 11, 13, 14 control signs of their output data to be positive, negator 12 controls sign of its output data to be negative, selector 9 selects the operation result outputted in the first time operation of output end 17 as valid input data, selector 10 selects the operation result, in the first time operation, outputted from output end 18 as valid input data, the operation result outputted from output end 17 is used as input data selected by the selector 9 in the third time operation, and the operation result outputted from output end 18 is used as input data selected by the selector 10 in the third time operation; in the third time operation, data Dr, W4r, Di, W4i are respectively input into input ends 2, 3, 4, 5, negators 11, 13, 14 control signs of their output data to be positive, negator 12 controls a sign of its output data to be negative, selector 9 selects the operation result, in the second time operation, outputted from output end 17 as valid input data, selector 10 selects the operation result, in the second time operation, outputted from output end 18 as valid input data, the operation result outputted from output end 17 is used as input data selected by the selector 9 in the fourth time operation, and the operation result outputted from output end 18 is used as input data selected by the selector 10 in the fourth time operation; in the fourth time operation, data Er, W2r, Ei, W2i are respectively input into input ends 2, 3, 4, 5, negators 11, 13, 14 control signs of their output data to be positive, negator 12 controls sign of its output data to be negative, selector 9 selects the operation result outputted in the third time operation of output end 17 as valid input data, and selector 10 selects the operation result, in the third time operation, outputted from output end 18 as valid input data; the fourth time operation result outputted from output end 17 is used as an operation result X4r of real part of X4, and the fourth time operation result outputted from output end 18 is used as an operation result X5r of real part of X5.

The processing of Formula (13) is shown in FIG. 11, which comprises four operations respectively shown in operation diagram 11a, operation diagram 11b, operation diagram 11c and operation diagram 11d, with solid lines indicating the direction of data flow. In the first time operation, data Ai, Br, W3i, Bi, W3r, Ai are respectively input into input ends 1, 2, 3, 4, 5, 6, negators 11, 12, 14 control signs of their output data to be positive, negator 13 controls sign of its output data to be negative, selector 9 selects data of input end 1 as valid input data, selector 10 selects data of input end 6 as valid input data, the operation result outputted from output end 17 is used as input data selected by the selector 9 in the second time operation, and the operation result outputted from output end 18 is used as input data selected by the selector 10 in the second time operation; in the second time operation, data Cr, W1i, Ci, W1r are respectively input into input ends 2, 3, 4, 5, negators 11, 12, 14 control signs of their output data to be positive, negator 13 controls a sign of its output data to be negative, selector 9 selects the operation result, in the first time operation, outputted from output end 17 as valid input data, selector 10 selects the operation result, in the first time operation, outputted from output end 18 as valid input data, the operation result outputted from output end 17 is used as input data selected by the selector 9 in the third time operation, and the operation result outputted from output end 18 is used as input data selected by the selector 10 in the third time operation; in the third time operation, data Dr, W4i, Di, W4r are respectively input into input ends 2, 3, 4, 5, negators 11, 12, 14 control signs of their output data to be positive, negator 13 controls a sign of its output data to be negative, selector 9 selects the operation result, in the second time operation, outputted from output end 17 as valid input data, selector 10 selects the operation result, in the second time operation, outputted from output end 18 as valid input data, the operation result outputted from output end 17 is used as input data selected by the selector 9 in the fourth time operation, and the operation result outputted from output end 18 is used as input data selected by the selector 10 in the fourth time operation; in the fourth time operation, data Er, W2i, Ei, W2r are respectively input into input ends 2, 3, 4, 5, negators 11, 12, 14 control signs of their output data to be positive, negator 13 controls a sign of its output data to be negative, selector 9 selects the operation result, in the third time operation, outputted from output end 17 as valid input data, and selector 10 selects the operation result, in the third time operation, outputted from output end 18 as valid input data; the fourth time operation result outputted from output end 17 is used as an operation result X4i of imaginary part of X4, and the fourth time operation result outputted from output end 18 is used as an operation result X5i of imaginary part of X5.

The above description are only the preferable embodiments of the present disclosure, which are not used to restrict the scope of protection of the present disclosure, and any amendments, equivalent substitutions or improvements, etc. within the spirit and principle of the present disclosure are all included in the scope of protection of the present disclosure.

INDUSTRIAL APPLICABILITY

As above, a vector operation core and a vector processor provided in embodiments of the present disclosure have the following beneficial effects: because one two-input adder is saved and two two-input adders are replaced by one three-input adder, this reduces chip area and power dissipation. By using the vector processor of the present disclosure, the butterfly operations in base 2, base 3 and base 5 fast Fourier transform may be supported simultaneously; when simultaneously calculating two branches of base 2 butterfly operations, since the number of multiplications is reduced by half, circuit power dissipation is reduced largely.

What is claimed is:

1. A vector operation core, comprising a first operation branch and a second operation branch; wherein the first operation branch comprises: input ends 1, 2, 3, multiplier 7, an either-or selector 9, negators 11, 12, a three-input adder 15 and an output end 17; and the second operation branch comprises: input ends 4, 5, 6, multiplier 8, an either-or selector 10, negators 13, 14, a three-input adder 16 and an output end 18; the negators 11, 12, 13, 14 are configured to control signs of output data of the negators 11, 12, 13, 14 respectively; wherein data of the input end 1 is input into one select input end of the either-or selector 9, data of the input ends 2, 3 is input into two input ends of the multiplier 7, and data outputted from the multiplier 7 is divided into two branches which are respectively input into input ends of the negators 11, 13 respectively; data of the input end 6 is input into one select input end of the either-or selector 10, data of the input ends 4, 5 is input into two input ends of the multiplier 8, and data outputted from the multiplier 8 is divided into two branches which are respectively input into input ends of the negators 12, 14; data outputted from the selector 9, negators 11, 12 is respectively input into three input ends of the adder 15; data outputted from selector 10, negators 13, 14 are respectively input into three input ends of the adder 16; data output from the adder 15 is divided into two branches which are respectively input into the output 17 and the other select input end of the selector 9; data output from the adder 16 is divided into two branches which are respectively input into the output 18 and the other select input end of the selector 10.

2. The vector operation core according to claim 1, wherein one register is disposed respectively between the input end 1 and the selector 9 and between the input end 6 and the selector 10; and one register is disposed respectively on the input ends of the multiplier 7, 8 and the output ends of the adder 15, 16.

3. A vector processor, comprising: a control unit and the vector operation core according to claim 2; wherein the control unit is configured to control respective valid input ends of the selectors 9, 10 in the vector operation core, and further configured to control respective signs of output data of negators 11, 12, 13, 14 in the vector operation core.

4. A vector processor, comprising: a control unit and the vector operation core according to claim 1; wherein the control unit is configured to control respective valid input ends of the selectors 9, 10 in the vector operation core, and further configured to control respective signs of output data of negators 11, 12, 13, 14 in the vector operation core.

5. The vector processor according to claim 4, when being used to implement the following operations of real parts in butterfly operations in a base 2 Fast-Fourier Transform:

$$X1=C+AB$$

$$X2=C-AB$$

where A, B and C are complex vectors, B is a rotation factor, and X1, X2 are output vectors of the butterfly operations in the base 2 Fast-Fourier Transform; after decomposing the real parts and imaginary parts, $$A=Ar+j\,Ai$$

$$B=Br+j\,Bi$$

$$C=Cr+j\,Ci$$

$$X1=X1r+j\,X1i$$

$$X2=X2r+j\,X2i$$

and, operation results of the real parts of X1, X2 are:

$$X1r=Cr+[Ar*Br-Ai*Bi]$$

$$X2r=Cr-[Ar*Br-Ai*Bi]$$

where data Cr, Ar, Br, Ai, Bi, Cr are respectively input into input ends 1, 2, 3, 4, 5, 6, negators 11, 14 control signs of output data of the negators 11, 14 to be positive respectively, negators 12, 13 control signs of output data of the negators 12, 13 to be negative respectively, a selector 9 selects data of the input end 1 as valid input data, a selector 10 selects data of the input end 6 as valid input data, an output end 17 outputs an operation result X1*r* of real part of X1, and an output end 18 outputs an operation result X2*r* of real part of X2.

6. The vector processor according to claim 5, when being used to implement the following operations of the imaginary parts in the butterfly operations in the base 2 Fast-Fourier Transform:

$$X1=C+AB$$

$$X2=C-AB$$

where A, B and C are complex vectors, B is a rotation factor, and X1, X2 are output vectors of the butterfly operations in the base 2 Fast-Fourier Transform; after decomposing the real parts and imaginary parts, $$A=Ar+jAi$$

$$B=Br+jBi$$

$$C=Cr+jCi$$

$$X1=X1r+jX1i$$

$$X2=X2r+jX2i$$

and operation results of the imaginary parts of X1, X2 are:

$$X1i=Ci+[Ar*Bi+Ai*Br]$$

$$X2i=Ci-[Ar*Bi+Ai*Br]$$

where data Ci, Ar, Bi, Ai, Br, Ci are respectively input into input ends 1, 2, 3, 4, 5, 6, negators 11, 12 control signs of output data of the negators 11, 12 to be positive, negators 13, 14 control signs of output data of the negators 13, 14 to be negative, a selector 9 selects data of the input end 1 as valid input data, a selector 10 selects data of the input end 6 as valid input data, an output end 17 outputs an operation result X1*i* of imaginary part of X1, and an output end 18 outputs an operation result X2*i* of imaginary part of X2.

7. The vector processor according to claim 4, when being used to implement the following operations of the imaginary parts in the butterfly operations in the base 2 Fast-Fourier Transform:

$$X1=C+AB$$

$$X2=C-AB$$

where A, B and C are complex vectors, B is a rotation factor, and X1, X2 are output vectors of the butterfly operations in the base 2 Fast-Fourier Transform; after decomposing the real parts and imaginary parts, $$A=Ar+jAi$$

$$B=Br+jBi$$

$$C=Cr+jCi$$

$$X1=X1r+jX1i$$

$$X2=X2r+jX2i$$

and operation results of the imaginary parts of X1, X2 are:

$$X1i=Ci+[Ar*Bi+Ai*Br]$$

$$X2i=Ci-[Ar*Bi+Ai*Br],$$

where data Ci, Ar, Bi, Ai, Br, Ci are respectively input into input ends 1, 2, 3, 4, 5, 6, negators 11, 12 control signs of output data of the negators 11, 12 to be positive, negators 13, 14 control signs of output data of the negators 13, 14 to be negative, a selector 9 selects data of the input end 1 as valid input data, a selector 10 selects data of the input end 6 as valid input data, an output end 17 outputs an operation result X1*i* of imaginary part of X1, and an output end 18 outputs an operation result X2*i* of imaginary part of X2.

8. The vector processor according to claim 4, when being used to implement the following operations of real parts of X2, X3 in butterfly operations in a base 3 Fast-Fourier Transform:

$$X1=A+B+C$$

$$X2=A+B*w1+C*w2$$

$$X3=A+B*\mathrm{conj}(w1)+C*\mathrm{conj}(w2)$$

where A, B and C are complex vectors, w1, w2 are rotation factors, and X1, X2, X3 are output vectors of the butterfly operations in the base 3 Fast-Fourier Transform; after decomposing the real parts and imaginary parts, $$A=Ar+jAi$$

$$B=Br+jBi$$

$$C=Cr+jCi$$

$$W1=W1r+jW1i$$

$$W2=W2r+jW2i$$

$$X1=X1r+jX1i$$

$$X2=X2r+jX2i$$

$$X3=X3r+jX3i$$

and operation results of the real parts and imaginary parts of X1, X2, X3 are:

$$X1r=Ar+Br+Cr$$

$$X1i=Ai+Bi+Ci$$

$$X2r=Ar+[Br*W1r-Bi*W1i]+[Cr*W2r-Ci*W2i]$$

$$X3r=Ar+[Br*W1r+Bi*W1i]+[Cr*W2r+Ci*W2i]$$

$$X2i=Ai+[Br*W1i+Bi*W1i]+[Cr*W2i+Ci*W2r]$$

$$X3i=Ai+[-Br*W1i+Bi*W1i]+[-Cr*W2i+Ci*W2r],$$

wherein two operations are comprised: in the first time operation, data Ar, Br, W1r, Bi, W1i, Ar are respectively input into input ends 1, 2, 3, 4, 5, 6, negators 11, 13, 14 control signs of output data of the negators 11, 13, 14 to be positive respectively, a negator 12 controls a sign of output data to be negative, a selector 9 selects data of the input end 1 as valid input data, a selector 10 selects data of the input end 6 as valid input data, an operation result outputted from an output end 17 is used as input data selected by the selector 9 in the second time operation, and an operation result outputted from an output end 18 is used as input data selected by the selector 10 in the second time operation; in the second time operation, data Cr, W2r, Ci, W2i are respectively input into the input ends 2, 3, 4, 5, the negators 11, 13, 14 control signs of output data of the negators 11, 13, 14 to be positive respectively, the negator 12 controls a sign of output data of the negator 12 to be negative, selector 9 selects the operation result, in the first time operation, outputted from the output end 17 as valid input data, and the selector 10 selects the operation result, in the first time operation, outputted from the output end 18 as valid input data; the second time operation result outputted from the output end 17 is used as an operation result X2r of real part of X2, and the second time operation result outputted from the output end 18 is used as an operation result X3r of real part of X3.

9. The vector processor according to claim 8, when being used to implement the following operations of imaginary parts of X2, X3 in butterfly operations in the base 3 Fast-Fourier Transform:

$$X1=A+B+C$$

$$X2=A+B*w1+C*w2$$

$$X3=A+B*conj(w1)+C*conj(w2)$$

where A, B and C are complex vectors, w1, w2 are rotation factors, and X1, X2, X3 are output vectors of butterfly operations in the base 3 Fast-Fourier Transform; after decomposing the real parts and imaginary parts, $$A=Ar+jAi$$

$$B=Br+jBi$$

$$C=Cr+jCi$$

$$W1=W1r+jW1i$$

$$W2=W2r+jW2i$$

$$X1=X1r+jX1i$$

$$X2=X2r+jX2i$$

$$X3=X3r+jX3i$$

and operation results of the real parts and the imaginary parts of X1, X2, X3 are:

$$X1r=Ar+Br+Cr$$

$$X1i=Ai+Bi+Ci$$

$$X2r=Ar+[Br*W1r-Bi*W1i]+[Cr*W2r-Ci*W2i]$$

$$X3r=Ar+[Br*W1r+Bi*W1i]+[Cr*W2r+Ci*W2i]$$

$$X2i=Ai+[Br*W1i+Bi*W1r]+[Cr*W2i+Ci*W2r]$$

$$X3i=Ai+[-Br*W1i+Bi*W1r]+[-Cr*W2i+Ci*W2r],$$

wherein two operations are comprised: in the first time operation, data Ai, Br, W1i, Bi, W1r, Ai are respectively input into input ends 1, 2, 3, 4, 5, 6, negators 11, 12, 14 control signs of output data of the negators 11, 12, 14 to be positive, a negator 13 controls a sign of output data of the negator 13 to be negative, a selector 9 selects data of input end 1 as valid input data, a selector 10 selects data of the input end 6 as valid input data, an operation result outputted from an output end 17 is used as input data selected by the selector 9 in the second time operation, and an operation result outputted from an output end 18 is used as input data selected by the selector 10 in the second time operation; in thesecond time operation, data Cr, W2i, Ci, W2r are respectively input into the input ends 2, 3, 4, 5, the negators 11, 12, 14 control signs of output data of the negators 11, 12, 14 to be positive, negator 13 controls a sign of output data of the negator 13 to be negative, the selector 9 selects the operation result, in the first time operation, outputted from the output end 17 as valid input data, and the selector 10 selects the operation result, in the first time operation, outputted from the output end 18 as valid input data; the second time operation result outputted from the output end 17 is used as an operation result X2i of imaginary part of X2, and the second time operation result outputted from the output end 18 is used as an operation result X3i of imaginary part of X3.

10. The vector processor according to claim 4, when being used to implement the following operations of imaginary parts of X2, X3 in butterfly operations in the base 3 Fast-Fourier Transform:

$$X1=A+B+C$$

$$X2=A+B*w1+C*w2$$

$$X3=A+B*conj(w1)+C*conj(w2)$$

where A, B and C are complex vectors, w1, w2 are rotation factors, and X1, X2, X3 are output vectors of butterfly operations in the base 3 Fast-Fourier Transform; after decomposing the real parts and imaginary parts, $$A=Ar+jAi$$

$$B=Br+jBi$$

$$C=Cr+jCi$$

$$W1=W1r+jW1i$$

$$W2=W2r+jW2i$$

$X1=X1r+jX1i$ $X2=X2r+jX2i$ $X3=X3r+jX3i$ and operation results of the real parts and the imaginary parts of X1, X2, X3 are:

$X1r=Ar+Br+Cr$ $X1i=Ai+Bi+Ci$ $X2r=Ar+[Br*W1r-Bi*W1i]+[Cr*W2r-Ci*W2i]$ $X3r=Ar+[Br*W1r+Bi*W1i]+[Cr*W2r+Ci*W2i]$ $X2i=Ai+[Br*W1i+Bi*W1r]+[Cr*W2i+Ci*W2r]$ $X3i=Ai+[-Br*W1i+Bi*W1r]+[-Cr*W2i+Ci*W2r]$, wherein two operations are comprised: in the first time operation, data Ai, Br, W1i, Bi, W1r, Ai are respectively input into input ends 1, 2, 3, 4, 5, 6, negators 11, 12, 14 control signs of output data of the negators 11, 12, 14 to be positive, a negator 13 controls a sign of output data of the negator 13 to be negative, a selector 9 selects data of input end 1 as valid input data, a selector 10 selects data of the input end 6 as valid input data, an operation result outputted from an output end 17 is used as input data selected by the selector 9 in the second time operation, and an operation result outputted from an output end 18 is used as input data selected by the selector 10 in the second time operation; in the second time operation, data Cr, W2i, Ci, W2r are respectively input into the input ends 2, 3, 4, 5, the negators 11, 12, 14 control signs of output data of the negators 11, 12, 14 to be positive, negator 13 controls a sign of output data of the negator 13 to be negative, the selector 9 selects the operation result, in the first time operation, outputted from the output end 17 as valid input data, and the selector 10 selects the operation result, in the first time operation, outputted from the output end 18 as valid input data; the second time operation result outputted from the output end 17 is used as an operation result X2i of imaginary part of X2, and the second time operation result outputted from the output end 18 is used as an operation result X3i of imaginary part of X3.

11. The vector processor according to claim 4, when being used to implement the following operations of real parts of X2, X3 in butterfly operations in a base 5 Fast-Fourier Transform:

$X1=A+B+C+D+E$ $X2=A+B*w1+C*w2+D*w3+E*w4$ $X3=A+B*\text{conj}(w1)+C*\text{conj}(w2)+D*\text{conj}(w3)+E*\text{conj}(w4)$ $X4=A+B*w3+C*w1+D*w4+E*w2$ $X5=A+B*\text{conj}(w3)+C*\text{conj}(w1)+D*\text{conj}(w4)+E*\text{conj}(w2)$ where A, B, C, D and E are complex vectors, w1, w2, w3, w4 are rotation factors, and X1, X2, X3, X4, X5 are output vectors of the butterfly operations in the base 5 Fast-Fourier Transform; after the decomposing the real parts and imaginary parts, $A=Ar+jAi$ $B=Br+jBi$ $C=Cr+jCi$ $D=Dr+jDi$ $E=Er+jEi$ $W1=W1r+jW1i$ $W2=W2r+j\ W2i$ $W3=W3r+j\ W3i$ $W4=W4r+j\ W4i$ $X1=X1r+jX1i$ $X2=X2r+jX2i$ $X3=X3r+jX3i$ $X4=X4r+jX4i$ $X5=X5r+jX5i$ and operation results of real parts and imaginary parts of X1, X2, X3, X4, X5 are:

$X1r=Ar+Br+Cr+Dr+Er$ $X1i=Ai+Bi+Ci+Di+Ei$ $X2r=Ar+[Br*W1r-Bi*W1i]+[Cr*W2r-Ci*W2i]+[Dr*W3r-Di*W3i]+[Er*W4r-Ei*W4i]$ $X3r=Ar+[Br*W1r+Bi*W1i]+[Cr*W2r+Ci*W2i]+[Dr*W3r+Di*W3i]+[Er*W4r+Ei*W4i]$ $X2i=Ai+[Br*W1i+Bi*W1i]+[Cr*W2i+Ci*W2r]+[Dr*W3i+Di*W3r]+[Er*W4i+Ei*W4r]$ $X3i=Ai+[-Br*W1i+Bi*W1i]+[-Cr*W2i+Ci*W2r]+[-Dr*W3i+Di*W3r]+[-Er*W4i+Ei*W4r]$ $X4r=Ar+[Br*W3r-Bi*W3i]+[Cr*W1r-Ci*W1i]+[Dr*W4r-Di*W4i]+[Er*W2r-Ei*W2i]$ $X5r=Ar+[Br*W3r+Bi*W3i]+[Cr*W1r+Ci*W1i]+[Dr*W4r+Di*W4i]+[Er*W2r+Ei*W2i]$ $X4i=Ai+[Br*W3i+Bi*W3r]+[Cr*W1i+Ci*W1r]+[Dr*W4i+Di*W4r]+[Er*W2i+Ei*W2r]$ $X5i=Ai+[-Br*W3i+Bi*W3r]+[-Cr*W1i+Ci*W1r]+[-Dr*W4i+Di*W4r]+[-Er*W2i+Ei*W2r]$, wherein four operations are comprised: in the first time operation, data Ar, Br, W1r, Bi, W1i, Ar are respectively input into input ends 1, 2, 3, 4, 5, 6, negators 11, 13, 14 control signs of output data of the negators 11, 13, 14 to be positive respectively, a negator 12 controls a sign of output data of the negator 12 to be negative, a selector 9 selects data of input end 1 as valid input data, a selector 10 selects data of input end 6 as valid input data, an operation result outputted from an output end 17 is used as input data selected by the selector 9 in the second time operation, and an operation result outputted from an output end 18 is used as input data selected by the selector 10 in the second time operation; in the second time operation, data Cr, W2r, Ci, W2i are respectively input into the input ends 2, 3, 4, 5, the negators 11, 13, 14 control signs of output data of the negators 11, 13, 14 to be positive respectively, the negator 12 controls a sign of output data of the negator 12 to be negative, the selector 9 selects the operation result, in the first time operation, outputted from the output end 17 as valid input data, the selector 10 selects the operation result, in the first time operation, outputted from the output end 18 as valid input data, the operation result outputted from the output end 17 is used as input data selected by the selector 9 in the third time operation, and the operation result outputted from the output end 18 is used as input data selected by the selector 10 in the third time operation; in the third time operation, data Dr, W3r, Di, W3i are respectively input into the input ends 2, 3, 4, 5, the negators 11, 13, 14 control signs of output data of the negators 11, 13, 14 to be positive respectively, negator 12 controls a sign of output data of the negator 12 to be negative, the selector 9 selects the operation result, in the second time operation, outputtedfrom the output end 17 as valid input data, the selector 10 selects the operation result, in the second time operation, outputted from the output end 18 as valid input data, the operation result outputted from the output end 17 is used as input data selected by the selector 9 in the fourth time operation, and the operation result outputted from the output end 18 is used as input data selected by the selector 10 in the fourth time operation; in the fourth time operation, data Er, W4r, Ei, W4i are respectively input into the input ends 2, 3, 4, 5, the negators 11, 13, 14 control signs of output data of the negators 11, 13, 14 to be positive, the negator 12 controls a sign of output data of the negator 12 to be negative, the selector 9 selects the operation result outputted in the third time operation of output end 17 as valid input data, and the selector 10 selects the operation result, in the third time operation, outputted from output end 18 as valid input data; the fourth time operation result outputted from the output end 17 is used as an operation result X2r of real part of X2, and the fourth time operation result outputted from the output end 18 is used as an operation result X3r of real part of X3.

12. The vector processor according to claim 11, when being used to implement the following operations of imaginary parts of X4, X5 in butterfly operations in the base 5 Fast-Fourier Transform:

$$X1=A+B+C+D+E$$

$$X2=A+B*w1+C*w2+D*w3+E*w4$$

$$X3=A+B*\mathrm{conj}(w1)+C*\mathrm{conj}(w2)+D*\mathrm{conj}(w3)+E*\mathrm{conj}(w4)$$

$$X4=A+B*w3+C*w1+D*w4+E*w2$$

$$X5=A+B*\mathrm{conj}(w3)+C*\mathrm{conj}(w1)+D*\mathrm{conj}(w4)+E*\mathrm{conj}(w2)$$

where A, B, C, D and E are complex vectors, w1, w2, w3, w4 are rotation factors, and X1, X2, X3, X4, X5 are output vectors of butterfly operations in the base 5 Fast-Fourier Transform; after decomposing the real parts and imaginary parts, $$A=Ar+jAi$$

$$B=Br+jBi$$

$$C=Cr+jCi$$

$$D=Dr+jDi$$

$$E=Er+jEi$$

$$W1=W1r+jW1i$$

$$W2=W2r+jW2i$$

$$W3=W3r+jW3i$$

$$W4=W4r+jW4i$$

$$X1=X1r+jX1i$$

$$X2=X2r+jX2i$$

$$X3=X3r+jX3i$$

$$X4=X4r+jX4i$$

$$X5=X5r+jX5i$$

and operation results of the real parts and imaginary parts of X1, X2, X3, X4, X5, $$X1r=Ar+Br+Cr+Dr+Er$$

$$X1i=Ai+Bi+Ci+Di+Ei$$

$$X2r=Ar+[Br*W1r-Bi*W1i]+[Cr*W2r-Ci*W2i]+[Dr*W3r-Di*W3i]+[Er*W4r-Ei*W4i]$$

$$X3r=Ar+[Br*W1r+Bi*W1i]+[Cr*W2r+Ci*W2i]+[Dr*W3r+Di*W3i]+[Er*W4r+Ei*W4i]$$

$$X2i=Ai+[Br*W1i+Bi*W1r]+[Cr*W2i+Ci*W2r]+[Dr*W3i+Di*W3r]+[Er*W4i+Ei*W4r]$$

$$X3i=Ai+[-Br*W1i+Bi*W1r]+[-Cr*W2i+Ci*W2r]+[-Dr*W3i+Di*W3r]+[-Er*W4i+Ei*W4r]$$

$$X4r=Ar+[Br*W3r-Bi*W3i]+[Cr*W1r-Ci*W1i]+[Dr*W4r-Di*W4i]+[Er*W2r-Ei*W2i]$$

$$X5r=Ar+[Br*W3r+Bi*W3i]+[Cr*W1r+Ci*W1i]+[Dr*W4r+Di*W4i]+[Er*W2r+Ei*W2i]$$

$$X4i=Ai+[Br*W3i+Bi*W3r]+[Cr*W1i+Ci*W1r]+[Dr*W4i+Di*W4r]+[Er*W2i+Ei*W2r]$$

$$X5i=Ai+[-Br*W3i+Bi*W3r]+[-Cr*W1i+Ci*W1r]+[-Dr*W4i+Di*W4r]+[-Er*W2i+Ei*W2r],$$

wherein four operations are comprised: in the first time operation, data Ai, Br, W3i, Bi, W3r, Ai are respectively input into input ends 1, 2, 3, 4, 5, 6, negators 11, 12, 14 control signs of output data of the negators 11, 12, 14 to be positive, a negator 13 controls a sign of output data of the negator 13 to be negative, a selector 9 selects data of the input end 1 as valid input data, a selector 10 selects data of the input end 6 as valid input data, an operation result outputted from the output end 17 is used as input data selected by the selector 9 in the second time operation, and an operation result outputted from the output end 18 is used as input data selected by the selector 10 in the second time operation; in the second time operation, data Cr, W1i, Ci, W1r are respectively input into the input ends 2, 3, 4, 5, the negators 11, 12, 14 control signs of output data of the negators 11, 12, 14 to be positive respectively, the negator 13 controls a sign of output data of the negator 13 to be negative, the selector 9 selects the operation result, in the first time operation, outputted from the output end 17 as valid input data, the selector 10 selects the operation result, in the first time operation, outputted from the output end 18 as valid input data, the operation result outputted from the output end 17 is used as input data selected by the selector 9 in the third time operation, and the operation result outputted from the output end 18 is used as input data selected by the selector 10 in the third time operation; in the third time operation, data Dr, W4$i$, Di, W4$r$ are respectively input into the input ends 2, 3, 4, 5, the negators 11, 12, 14 control signs of output data of the negators 11, 12, 14 to be positive respectively, the negator 13 controls a sign of output data of the the negator 13 to be negative, the selector 9 selects the operation result, in the second time operation, outputted from the output end 17 as valid input data, the selector 10 selects the operation result, in the second time operation, outputted from the output end 18 as valid input data, the operation result outputted from the output end 17 is used as input data selected by the selector 9 in the fourth time operation, and the operation result outputted from the output end 18 is used as input data selected by the selector 10 in the fourth time operation; in the fourth time operation, data Er, W2$i$, Ei, W2$r$ are respectively input into the input ends 2, 3, 4, 5, the negators 11, 12, 14 control signs of output data of the the negators 11, 12, 14 to be positive respectively, the negator 13 controls a sign of output data of the negator 13 to be negative, the selector 9 selects the operation result, in the third time operation, outputted from the output end 17 as valid input data, and the selector 10 selects the operation result outputted in the third time operation of the output end 18 as valid input data; the fourth time operation result outputted from the output end 17 is used as an operation result X4$i$ of imaginary part of X4, and the fourth time operation result outputted from the output end 18 is used as an operation result X5$i$ of imaginary part of X5.

13. The vector processor according to claim 4, when being used to implement the following operations of imaginary parts of X2, X3 in butterfly operations in the base 5 Fast-Fourier Transform:

$$X1 = A+B+C+D+E$$

$$X2 = A+B*w1+C*w2+D*w3+E*w4$$

$$X3 = A+B*\mathrm{conj}(w1)+C*\mathrm{conj}(w2)+D*\mathrm{conj}(w3)+E*\mathrm{conj}(w4)$$

$$X4 = A+B*w3+C*w1+D*w4+E*w2$$

$$X5 = A+B*\mathrm{conj}(w3)+C*\mathrm{conj}(w1)+D*\mathrm{conj}(w4)+E*\mathrm{conj}(w2)$$

where A, B, C, D and E are complex vectors, w1, w2, w3, w4 are rotation factors, and X1, X2, X3, X4, X5 are output vectors of the butterfly operations in the base 5 Fast-Fourier Transform; after decomposing the real parts and imaginary parts, $$A = Ar + jAi$$

$$B = Br + jBi$$

$$C = Cr + jCi$$

$$D = Dr + jDi$$

$$E = Er + jEi$$

$$W1 = W1r + jW1i$$

$$W2 = W2r + jW2i$$

$$W3 = W3r + jW3i$$

$$W4 = W4r + jW4i$$

$$X1 = X1r + jX1i$$

$$X2 = X2r + jX2i$$

$$X3 = X3r + jX3i$$

$$X4 = X4r + jX4i$$

$$X5 = X5r + jX5i$$

and operation results of real parts and imaginary parts of X1, X2, X3, X4, X5 are $$X1r = Ar+Br+Cr+Dr+Er$$

$$X1i = Ai+Bi+Ci+Di+Ei$$

$$X2r = Ar+[Br*W1r-Bi*W1i]+[Cr*W2r-Ci*W2i]+[Dr*W3r-Di*W3i]+[Er*W4r-Ei*W4i]$$

$$X3r = Ar+[Br*W1r+Bi*W1i]+[Cr*W2r+Ci*W2i]+[Dr*W3r+Di*W3i]+[Er*W4r+Ei*W4i]$$

$$X2i = Ai+[Br*W1i+Bi*W1r]+[Cr*W2i+Ci*W2r]+[Dr*W3i+Di*W3r]+[Er*W4i+Ei*W4r]$$

$$X3i = Ai+[-Br*W1i+Bi*W1r]+[-Cr*W2i+Ci*W2r]+[-Dr*W3i+Di*W3r]+[-Er*W4i+Ei*W4r]$$

$$X4r = Ar+[Br*W3r-Bi*W3i]+[Cr*W1r-Ci*W1i]+[Dr*W4r-Di*W4i]+[Er*W2r-Ei*W2i]$$

$$X5r = Ar+[Br*W3r+Bi*W3i]+[Cr*W1r+Ci*W1i]+[Dr*W4r+Di*W4i]+[Er*W2r+Ei*W2i]$$

$$X4i = Ai+[Br*W3i+Bi*W3r]+[Cr*W1i+Ci*W1r]+[Dr*W4i+Di*W4r]+[Er*W2i+Ei*W2r]$$

$$X5i = Ai+[-Br*W3i+Bi*W3r]+[-Cr*W1i+Ci*W1r]+[-Dr*W4i+Di*W4r]+[-Er*W2i+Ei*W2r],$$

wherein four operations are comprised: in the first time operation, data Ai, Br, W1$i$, Bi, W1$r$, Ai are respectively input into input ends 1, 2, 3, 4, 5, 6, negators 11, 12, 14 control signs of output data of the negators 11, 12, 14 to be positive respectively, a negator 13 controls a sign of output data of the negator 13 to be negative, selector 9 selects data of input end 1 as valid input data, selector 10 selects data of input end 6 as valid input data, an operation result outputted from an output end 17 is used as input data selected by the selector 9 in the second time operation, and an operation result outputted from an output end 18 is used as input data selected by the selector 10 in the second time operation; in the second time operation, data Cr, W2$i$, Ci, W2$r$ are respectively input into the input ends 2, 3, 4, 5, the negators 11, 12, 14 control signs of output data of the negators 11, 12, 14 to be positive respectively, the negator 13 controls a sign of output data of the negator 13 to be negative, selector 9 selects the operation result, in the first time operation, outputted from the output end 17 as valid input data, the selector 10 selects the operation result, in the first time operation, outputted from the output end 18 as valid input data, the operation result outputted from the output end 17 is used as input data selected by the selector 9 in the third time operation, and the operation result outputted from the output end 18 is used as input data selected by the selector 10 in the third time operation; in the third time operation, data Dr, W3$i$, Di, W3$r$ are respectively the input into the input ends 2, 3, 4, 5, the negators 11, 12, 14 control signs of output data of the negators 11, 12, 14 to be positive, the negator 13 controls a sign of output data of the negator 13 to be negative, the selector 9 selects the operation result, in the second time operation, outputted from output end 17 as valid input data, the selector 10 selects the operation result, in the second time operation, outputted from the output end 18 as valid input data, the operation result outputted from the output end 17 is used as input data selected by the selector 9 in the fourth time operation, and the operation result outputted from the output end 18 is used as input data selected by the selector 10 in the fourth time operation; in the fourth time operation, data Er, W4$i$, Ei, W4$r$ are respectively input into the input ends 2, 3, 4, 5, the negators 11, 12, 14 control signs of output data of the negators 11, 12, 14 to be positive respectively, the negator 13 controls a sign of output data of the negator 13 to be negative, the selector 9 selects the operation result, in the third time operation, outputted from output end 17 as valid input data, and the selector 10 selects the operation result, in the third time operation, outputted from the output end 18 as valid input data; the fourth time operation result outputted from the output end 17 is used as an operation result X2$i$ of imaginary part of X2, and the fourth time operation result outputted from output end 18 is used as an operation result X3$i$ of imaginary part of X3.

14. The vector processor according to claim 13, when being used to implement the following operations of imaginary parts of X4, X5 in butterfly operations in the base 5 Fast-Fourier Transform:

$$X1=A+B+C+D+E$$

$$X2=A+B*w1+C*w2+D*w3+E*w4$$

$$X3=A+B*\text{conj}(w1)+C*\text{conj}(w2)+D*\text{conj}(w3)+E*\text{conj}(w4)$$

$$X4=A+B*w3+C*w1+D*w4+E*w2$$

$$X5=A+B*\text{conj}(w3)+C*\text{conj}(w1)+D*\text{conj}(w4)+E*\text{conj}(w2)$$

where A, B, C, D and E are complex vectors, w1, w2, w3, w4 are rotation factors, and X1, X2, X3, X4, X5 are output vectors of butterfly operations in the base 5 Fast-Fourier Transform; after decomposing the real parts and imaginary parts, $$A=Ar+jAi$$

$$B=Br+jBi$$

$$C=Cr+jCi$$

$$D=Dr+jDi$$

$$E=Er+jEi$$

$$W1=W1r+jW1i$$

$$W2=W2r+jW2i$$

$$W3=W3r+jW3i$$

$$W4=W4r+jW4i$$

$$X1=X1r+jX1i$$

$$X2=X2r+jX2i$$

$$X3=X3r+jX3i$$

$$X4=X4r+jX4i$$

$$X5=X5r+jX5i$$

and operation results of the real parts and imaginary parts of X1, X2, X3, X4, X5, $$X1r=Ar+Br+Cr+Dr+Er$$

$$X1i=Ai+Bi+Ci+Di+Ei$$

$$X2r=Ar+[Br*W1r-Bi*W1i]+[Cr*W2r-Ci*W2i]+[Dr*W3r-Di*W3i]+[Er*W4r-Ei*W4i]$$

$$X3r=Ar+[Br*W1r+Bi*W1i]+[Cr*W2r+Ci*W2i]+[Dr*W3r+Di*W3i]+[Er*W4r+Ei*W4i]$$

$$X2i=Ai+[Br*W1i+Bi*W1r]+[Cr*W2i+Ci*W2r]+[Dr*W3i+Di*W3r]+[Er*W4i+Ei*W4r]$$

$$X3i=Ai+[-Br*W1i+Bi*W1r]+[-Cr*W2i+Ci*W2r]+[-Dr*W3i+Di*W3r]+[-Er*W4i+Ei*W4r]$$

$$X4r=Ar+[Br*W3r-Bi*W3i]+[Cr*W1r-Ci*W1i]+[Dr*W4r-Di*W4i]+[Er*W2r-Ei*W2i]$$

$$X5r=Ar+[Br*W3r+Bi*W3i]+[Cr*W1r+Ci*W1i]+[Dr*W4r+Di*W4i]+[Er*W2r+Ei*W2i]$$

$$X4i=Ai+[Br*W3i+Bi*W3r]+[Cr*W1i+Ci*W1r]+[Dr*W4i+Di*W4r]+[Er*W2i+Ei*W2r]$$

$$X5i=Ai+[-Br*W3i+Bi*W3r]+[-Cr*W1i+Ci*W1r]+[-Dr*W4i+Di*W4r]+[-Er*W2i+Ei*W2r],$$

wherein four operations are comprised: in the first time operation, data Ai, Br, W3$i$, Bi, W3$r$, Ai are respectively input into input ends 1, 2, 3, 4, 5, 6, negators 11, 12, 14 control signs of output data of the negators 11, 12, 14 to be positive, a negator 13 controls a sign of output data of the negator 13 to be negative, a selector 9 selects data of the input end 1 as valid input data, a selector 10 selects data of the input end 6 as valid input data, an operation result outputted from the output end 17 is used as input data selected by the selector 9 in the second time operation, and an operation result outputted from the output end 18 is used as input data selected by the selector 10 in the second time operation; in the second time operation, data Cr, W1$i$, Ci, W1$r$ are respectively input into the input ends 2, 3, 4, 5, the negators 11, 12, 14 control signs of output data of the negators 11, 12, 14 to be positive respectively, the negator 13 controls a sign of output data of the negator 13 to be negative, the selector 9 selects the operation result, in the first time operation, outputted from the output end 17 as valid input data, the selector 10 selects the operation result, in the first time operation, outputted from the output end 18 as valid input data, the operation result outputted from the output end 17 is used as input data selected by the selector 9 in the third time operation, and the operation result outputted from the output end 18 is used as input data selected by the selector 10 in the third time operation; in the third time operation, data Dr, W4$i$, Di, W4$r$ are respectively input into the input ends 2, 3, 4, 5, the negators 11, 12, 14 control signs of output data of the negators 11, 12, 14 to be positive respectively, the negator 13 controls a sign of output data of the the negator 13 to be negative, the selector 9 selects the operation result, in the second time operation, outputted from the output end 17 as valid input data, the selector 10 selects the operation result, in the second time operation, outputted from the output end 18 as valid input data, the operation result outputted from the output end 17 is used as input data selected by the selector 9 in the fourth time operation, and the operation result outputted from the output end 18 is used as input data selected by the selector 10 in the fourth time operation; in the fourth time operation, data Er, W2$i$, Ei, W2$r$ are respectively input into the input ends 2, 3, 4, 5, the negators 11, 12, 14 control signs of output data of the the negators 11, 12, 14 to be positive respectively, the negator 13 controls a sign of output data of the negator 13 to be negative, the selector 9 selects the operation result, in the third time operation, outputted from the output end 17 as valid input data, and the selector 10 selects the operation result outputted in the third time operation of the output end 18 as valid input data; the fourth time operation result outputted from the output end 17 is used as an operation result X4$i$ of imaginary part of X4, and the fourth time operation result outputted from the output end 18 is used as an operation result X5$i$ of imaginary part of X5.

15. The vector processor according to claim 4, when being used to implement the following operations of real parts of X4, X5 in butterfly operations in the base 5 Fast-Fourier Transform:

$$X1=A+B+C+D+E$$

$$X2=A+B*w1+C*w2+D*w3+E*w4$$

$$X3=A+B*\text{conj}(w1)+C*\text{conj}(w2)+D*\text{conj}(w3)+E*\text{conj}(w4)$$

$$X4=A+B*w3+C*w1+D*w4+E*w2$$

$$X5=A+B*\text{conj}(w3)+C*\text{conj}(w1)+D*\text{conj}(w4)+E*\text{conj}(w2)$$

where A, B, C, D and E are complex vectors, w1, w2, w3, w4 are rotation factors, and X1, X2, X3, X4, X5 are output vectors of butterfly operations in the base 5 Fast-Fourier Transform; after decomposing real parts and imaginary parts, $$A=Ar+jAi$$

$$B=Br+jBi$$

$$C=Cr+jCi$$

$$D=Dr+jDi$$

$$E=Er+jEi$$

$$W1=W1r+jW1i$$

$$W2=W2r+jW2i$$

$$W3=W3r+jW3i$$

$$W4=W4r+jW4i$$

$$X1=X1r+jX1i$$

$$X2=X2r+jX2i$$

$$X3=X3r+jX3i$$

$$X4=X4r+jX4i$$

$$X5=X5r+jX5i$$

and operation results of real parts and imaginary parts of X1, X2, X3, X4, X5 are $$X1r=Ar+Br+Cr+Dr+Er$$

$$X1i=Ai+Bi+Ci+Di+Ei$$

$$X2r=Ar+[Br*W1r-Bi*W1i]+[Cr*W2r-Ci*W2i]+[Dr*W3r-Di*W3i]+[Er*W4r-Ei*W4i]$$

$$X3r=Ar+[Br*W1r+Bi*W1i]+[Cr*W2r+Ci*W2i]+[Dr*W3r+Di*W3i]+[Er*W4r+Ei*W4i]$$

$$X2i=Ai+[Br*W1i+Bi*W1i]+[Cr*W2i+Ci*W2r]+[Dr*W3i+Di*W3r]+[Er*W4i+Ei*W4r]$$

$$X3i=Ai+[-Br*W1i+Bi*W1r]+[-Cr*W2i+Ci*W2r]+[-Dr*W3i+Di*W3r]+[-Er*W4i+Ei*W4r]$$

$$X4r=Ar+[Br*W3r-Bi*W3i]+[Cr*W1r-Ci*W1i]+[Dr*W4r-Di*W4i]+[Er*W2r-Ei*W2i]$$

$$X5r=Ar+[Br*W3r+Bi*W3i]+[Cr*W1r+Ci*W1i]+[Dr*W4r+Di*W4i]+[Er*W2r+Ei*W2i]$$

$$X4i=Ai+[Br*W3i+Bi*W3r]+[Cr*W1i+Ci*W1r]+[Dr*W4i+Di*W4r]+[Er*W2i+Ei*W2r]$$

$$X5i=Ai+[-Br*W3i+Bi*W3r]+[-Cr*W1i+Ci*W1r]+[-Dr*W4i+Di*W4r]+[-Er*W2i+Ei*W2r],$$

wherein four operations are comprised: in the first time operation, data Ar, Br, W3$r$, Bi, W3$i$, Ar are respectively input into input ends 1, 2, 3, 4, 5, 6, negators 11, 13, 14 control signs of output data of the negators 11, 13, 14 to be positive respectively, a negator 12 controls a sign of output data of the negator 12 to be negative, a selector 9 selects data of the input end 1 as valid input data, a selector 10 selects data of the input end 6 as valid input data, an operation result outputted from an output end 17 is used as input data selected by the selector 9 in the second time operation, and an operation result outputted from an output end 18 is used as input data selected by the selector 10 in the second time operation; in the second time operation, data Cr, W1$r$, Ci, W1$i$ are respectively input into the input ends 2, 3, 4, 5, the negators 11, 13, 14 control signs of output data of the the negators 11, 13, 14 to be positive respectively, the negator 12 controls a sign of output data of the the negator 12 to be negative, the selector 9 selects the operation result, in the first time operation, outputted from the output end 17 as valid input data, the selector 10 selects the operation result, in the first time operation, outputted from the output end 18 as valid input data, the operation result outputted from the output end 17 is used as input data selected by the selector 9 in the third time operation, and the operation result outputted from the output end 18 is used as input data selected by the selector 10 in the third time operation; in the third time operation, data Dr, W4$r$, Di, W4$i$ are respectively input into the input ends 2, 3, 4, 5, the negators 11, 13, 14 control signs of output data of the negators 11, 13, 14 to be positive respectively, the negator 12 controls a sign of output data of the the negator 12 to be negative, the selector 9 selects the operation result, in the second time operation, outputted from the output end 17 as valid input data, the selector 10 selects the operation result, in the second time operation, outputted from the output end 18 as valid input data, the operation result outputted from the output end 17 is used as input data selected by the selector 9 in the fourth time operation, and the operation result outputted from the output end 18 is used as input data selected by the selector 10 in the fourth time operation; in the fourth time operation, data Er, W2r, Ei, W2i are respectively input into the input ends 2, 3, 4, 5, the negators 11, 13, 14 control signs of output data of the negators 11, 13, 14 to be positive respectively, the negator 12 controls sign of output data of the the negator 12 to be negative, the selector 9 selects the operation result, in the third time operation, outputted from the output end 17 as valid input data, and the selector 10 selects the operation result, in the third time operation, outputted from the output end 18 as valid input data; the fourth time operation result outputted from the output end 17 is used as an operation result X4r of real part of X4, and the fourth time operation result outputted from the output end 18 isused as an operation result X5r of real part of X5.

16. The vector processor according to claim 15, when being used to implement the following operations of imaginary parts of X4, X5 in butterfly operations in the base 5 Fast-Fourier Transform:

$$X1=A+B+C+D+E$$

$$X2=A+B*w1+C*w2+D*w3+E*w4$$

$$X3=A+B*\text{conj}(w1)+C*\text{conj}(w2)+D*\text{conj}(w3)+E*\text{conj}(w4)$$

$$X4=A+B*w3+C*w1+D*w4+E*w2$$

$$X5=A+B*\text{conj}(w3)+C*\text{conj}(w1)+D*\text{conj}(w4)+E*\text{conj}(w2)$$

where A, B, C, D and E are complex vectors, w1, w2, w3, w4 are rotation factors, and X1, X2, X3, X4, X5 are output vectors of butterfly operations in the base 5 Fast-Fourier Transform; after decomposing the real parts and imaginary parts, $$A=Ar+jAi$$

$$B=Br+j\,Bi$$

$$C=Cr+j\,Ci$$

$$D=Dr+j\,Di$$

$$E=Er+j\,Ei$$

$$W1=W1r+jW1i$$

$$W2=W2r+jW2i$$

$$W3=W3r+jW3i$$

$$W4=W4r+jW4i$$

$$X1=X1r+jX1i$$

$$X2=X2r+jX2i$$

$$X3=X3r+jX3i$$

$$X4=X4r+jX4i$$

$$X5=X5r+jX5i$$

and operation results of the real parts and imaginary parts of X1, X2, X3, X4, X5, $$X1r=Ar+Br+Cr+Dr+Er$$

$$X1i=Ai+Bi+Ci+Di+Ei$$

$$X2r=Ar+[Br*W1r-Bi*W1i]+[Cr*W2r-Ci*W2i]+[Dr*W3r-Di*W3i]+[Er*W4r-Ei*W4i]$$

$$X3r=Ar+[Br*W1r+Bi*W1i]+[Cr*W2r+Ci*W2i]+[Dr*W3r+Di*W3i]+[Er*W4r+Ei*W4i]$$

$$X2i=Ai+[Br*W1i+Bi*W1r]+[Cr*W2i+Ci*W2r]+[Dr*W3i+Di*W3r]+[Er*W4i+Ei*W4r]$$

$$X3i=Ai+[-Br*W1i+Bi*W1r]+[-Cr*W2i+Ci*W2r]+[-Dr*W3i+Di*W3r]+[-Er*W4i+Ei*W4r]$$

$$X4r=Ar+[Br*W3r-Bi*W3i]+[Cr*W1r-Ci*W1i]+[Dr*W4r-Di*W4i]+[Er*W2r-Ei*W2i]$$

$$X5r=Ar+[Br*W3r+Bi*W3i]+[Cr*W1r+Ci*W1i]+[Dr*W4r+Di*W4i]+[Er*W2r+Ei*W2i]$$

$$X4i=Ai+[Br*W3i+Bi*W3r]+[Cr*W1i+Ci*W1r]+[Dr*W4i+Di*W4r]+[Er*W2i+Ei*W2r]$$

$$X5i=Ai+[-Br*W3i+Bi*W3r]+[-Cr*W1i+Ci*W1r]+[-Dr*W4i+Di*W4r]+[-Er*W2i+Ei*W2r],$$

wherein four operations are comprised: in the first time operation, data Ai, Br, W3i, Bi, W3r, Ai are respectively input into input ends 1, 2, 3, 4, 5, 6, negators 11, 12, 14 control signs of output data of the negators 11, 12, 14 to be positive, a negator 13 controls a sign of output data of the negator 13 to be negative, a selector 9 selects data of the input end 1 as valid input data, a selector 10 selects data of the input end 6 as valid input data, an operation result outputted from the output end 17 is used as input data selected by the selector 9 in the second time operation, and an operation result outputted from the output end 18 is used as input data selected by the selector 10 in the second time operation; in the second time operation, data Cr, W1i, Ci, W1r are respectively input into the input ends 2, 3, 4, 5, the negators 11, 12, 14 control signs of output data of the negators 11, 12, 14 to be positive respectively, the negator 13 controls a sign of output data of the negator 13 to be negative, the selector 9 selects the operation result, in the first time operation, outputted from the output end 17 as valid input data, the selector 10 selects the operation result, in the first time operation, outputted from the output end 18 as valid input data, the operation result outputted from the output end 17 is used as input data selected by the selector 9 in the third time operation, and the operation result outputted from the output end 18 is used as input data selected by the selector 10 in the third time operation; in the third time operation, data Dr, W4i, Di, W4r are respectively input into the input ends 2, 3, 4, 5, the negators 11, 12, 14 control signs of output data of the negators 11, 12, 14 to be positive respectively, the negator 13 controls a sign of output data of the the negator 13 to be negative, the selector 9 selects the operation result, in the second time operation, outputted from the output end 17 as valid input data, the selector 10 selects the operation result, in the second time operation, outputted from the output end 18 as valid input data, the operation result outputted from the output end 17 is used as input data selected by the selector 9 in the fourth time operation, and the operation result outputted from the output end 18 is used as input data selected by the selector 10 in the fourth time operation; in the fourth time operation, data Er, W2i, Ei, W2r are respectively input into the input ends 2, 3, 4, 5, the negators 11, 12, 14 control signs of output data of the the negators 11, 12, 14 to be positive respectively, the negator 13 controls a sign of output data of the negator 13 to be negative, the selector 9 selects the operation result, in the third time operation, outputted from the output end 17 as valid input data, and the selector 10 selects the operation result outputted in the third time operation of the output end 18 as valid input data; the fourth time operation result outputted from the output end 17 is used as an operation result X4i of imaginary part of X4, and the fourth time operation result outputted from the output end 18 is used as an operation result X5i of imaginary part of X5.

17. The vector processor according to claim 4, when being used to implement the following operations of imaginary parts of X4, X5 in butterfly operations in the base 5 Fast-Fourier Transform:

$$X1=A+B+C+D+E$$

$$X2=A+B*w1+C*w2+D*w3+E*w4$$

$$X3=A+B*\mathrm{conj}(w1)+C*\mathrm{conj}(w2)+D*\mathrm{conj}(w3)+E*\mathrm{conj}(w4)$$

$$X4=A+B*w3+C*w1+D*w4+E*w2$$

$$X5=A+B*\mathrm{conj}(w3)+C*\mathrm{conj}(w1)+D*\mathrm{conj}(w4)+E*\mathrm{conj}(w2)$$

where A, B, C, D and E are complex vectors, w1, w2, w3, w4 are rotation factors, and X1, X2, X3, X4, X5 are output vectors of butterfly operations in the base 5 Fast-Fourier Transform; after decomposing the real parts and imaginary parts, $$A=Ar+jAi$$

$$B=Br+jBi$$

$$C=Cr+jCi$$

$$D=Dr+jDi$$

$$E=Er+jEi$$

$$W1=W1r+jW1i$$

$$W2=W2r+jW2i$$

$$W3=W3r+jW3i$$

$$W4=W4r+jW4i$$

$$X1=X1r+jX1i$$

$$X2=X2r+jX2i$$

$$X3=X3r+jX3i$$

$$X4=X4r+jX4i$$

$$X5=X5r+jX5i$$

and operation results of the real parts and imaginary parts of X1, X2, X3, X4, X5, $$X1r=Ar+Br+Cr+Dr+Er$$

$$X1i=Ai+Bi+Ci+Di+Ei$$

$$X2r=Ar+[Br*W1r-Bi*W1i]+[Cr*W2r-Ci*W2i]+[Dr*W3r-Di*W3i]+[Er*W4r-Ei*W4i]$$

$$X3r=Ar+[Br*W1r+Bi*W1i]+[Cr*W2r+Ci*W2i]+[Dr*W3r+Di*W3i]+[Er*W4r+Ei*W4i]$$

$$X2i=Ai+[Br*W1i+Bi*W1r]+[Cr*W2i+Ci*W2r]+[Dr*W3i+Di*W3r]+[Er*W4i+Ei*W4r]$$

$$X3i=Ai+[-Br*W1i+Bi*W1r]+[-Cr*W2i+Ci*W2r]+[-Dr*W3i+Di*W3r]+[-Er*W4i+Ei*W4r]$$

$$X4r=Ar+[Br*W3r-Bi*W3i]+[Cr*W1r-Ci*W1i]+[Dr*W4r-Di*W4i]+[Er*W2r-Ei*W2i]$$

$$X5r=Ar+[Br*W3r+Bi*W3i]+[Cr*W1r+Ci*W1i]+[Dr*W4r+Di*W4i]+[Er*W2r+Ei*W2i]$$

$$X4i=Ai+[Br*W3i+Bi*W3r]+[Cr*W1i+Ci*W1r]+[Dr*W4i+Di*W4r]+[Er*W2i+Ei*W2r]$$

$$X5i=Ai+[-Br*W3i+Bi*W3r]+[-Cr*W1i+Ci*W1r]+[-Dr*W4i+Di*W4r]+[-Er*W2i+Ei*W2r],$$

wherein four operations are comprised: in the first time operation, data Ai, Br, W3i, Bi, W3r, Ai are respectively input into input ends 1, 2, 3, 4, 5, 6, negators 11, 12, 14 control signs of output data of the negators 11, 12, 14 to be positive, a negator 13 controls a sign of output data of the negator 13 to be negative, a selector 9 selects data of the input end 1 as valid input data, a selector 10 selects data of the input end 6 as valid input data, an operation result outputted from the output end 17 is used as input data selected by the selector 9 in the second time operation, and an operation result outputted from the output end 18 is used as input data selected by the selector 10 in the second time operation; in the second time operation, data Cr, W1i, Ci, W1r are respectively input into the input ends 2, 3, 4, 5, the negators 11, 12, 14 control signs of output data of the negators 11, 12, 14 to be positive respectively, the negator 13 controls a sign of output data of the negator 13 to be negative, the selector 9 selects the operation result, in the first time operation, outputted from the output end 17 as valid input data, the selector 10 selects the operation result, in the first time operation, outputted from the output end 18 as valid input data, the operation result outputted from the output end 17 is used as input data selected by the selector 9 in the third time operation, and the operation result outputted from the output end 18 is used as input data selected by the selector 10 in the third time operation; in the third time operation, data Dr, W4i, Di, W4r are respectively input into the input ends 2, 3, 4, 5, the negators 11, 12, 14 control signs of output data of the negators 11, 12, 14 to be positive respectively, the negator 13 controls a sign of output data of the the negator 13 to be negative, the selector 9 selects the operation result, in the second time operation, outputted from the output end 17 as valid input data, the selector 10 selects the operation result, in the second time operation, outputted from the output end 18 as valid input data, the operation result outputted from the output end 17 is used as input data selected by the selector 9 in the fourth time operation, and the operation result outputted from the output end 18 is used as input data selected by the selector 10 in the fourth time operation; in the fourth time operation, data Er, W2i, Ei, W2r are respectively input into the input ends 2, 3, 4, 5, the negators 11, 12, 14 control signs of output data of the the negators 11, 12, 14 to be positive respectively, the negator 13 controls a sign of output data of the negator 13 to be negative, the selector 9 selects the operation result, in the third time operation, outputted from the output end 17 as valid input data, and the selector 10 selects the operation result outputted in the third time operation of the output end 18 as valid input data; the fourth time operation result outputted from the output end 17 is used as an operation result X4$i$ of imaginary part of X4, and the fourth time operation result outputted from the output end 18 is used as an operation result X5$i$ of imaginary part of X5.

* * * * *